(12) United States Patent
Hao et al.

(10) Patent No.: US 10,509,800 B2
(45) Date of Patent: Dec. 17, 2019

(54) VISUALLY INTERACTIVE IDENTIFICATION OF A COHORT OF DATA OBJECTS SIMILAR TO A QUERY BASED ON DOMAIN KNOWLEDGE

(71) Applicant: HEWLETT-PACKARD DEVELOPMENT COMPANY, L.P., Houston, TX (US)

(72) Inventors: Ming C Hao, Palo Alto, CA (US); Wei-Nchih Lee, Palo Alto, CA (US); Nelson L Chang, Palo Alto, CA (US); Michael Hund, Constance (DE); Daniel Keim, Constance (DE)

(73) Assignee: Hewlett-Packard Development Company, L.P., Spring, TX (US)

( * ) Notice: Subject to any disclaimer, the term of this patent is extended or adjusted under 35 U.S.C. 154(b) by 164 days.

(21) Appl. No.: 15/519,734

(22) PCT Filed: Jan. 23, 2015

(86) PCT No.: PCT/US2015/012681
§ 371 (c)(1),
(2) Date: Apr. 17, 2017

(87) PCT Pub. No.: WO2016/118156
PCT Pub. Date: Jul. 28, 2016

(65) Prior Publication Data
US 2017/0316071 A1    Nov. 2, 2017

(51) Int. Cl.
*G06F 16/26* (2019.01)
*G06F 16/2458* (2019.01)
(Continued)

(52) U.S. Cl.
CPC ............ *G06F 16/26* (2019.01); *G06F 16/248* (2019.01); *G06F 16/2465* (2019.01); *G06F 3/04847* (2013.01)

(58) Field of Classification Search
CPC .... G06F 16/26; G06F 16/2465; G06F 16/248; G06F 3/04847
(Continued)

(56) References Cited

U.S. PATENT DOCUMENTS 5,893,095 A * 4/1999 Jain ........................ G06F 16/58
6,122,628 A    9/2000 Castelli et al.
(Continued)

FOREIGN PATENT DOCUMENTS

WO    WO-2011001817 A1 *  1/2011    ......... G06K 9/00523

OTHER PUBLICATIONS

Mamitsuka, H., "Iteratively Selecting Feature Subsets for Mining from High-Dimensional Databases", T. Elomaa et al. (Eds.): PKDD, LNAI 2431, pp. 361-372, 2002. (Year: 2002).*
(Continued)

*Primary Examiner* — Phuong Thao Cao
(74) *Attorney, Agent, or Firm* — HPI Patent Department

(57) ABSTRACT

Visually interactive identification of a cohort of similar data objects is disclosed. One example is a system including a data processor to access a plurality of data objects, each data object comprising a plurality of numerical components, where each component represents a data feature of a plurality of data features, and to identify, for each data feature, a feature distribution of the numerical components. A selector selects a sub-plurality of the data features of a query object, where a given data feature is selected if the component representing the given data feature is a peak for the feature distribution. An evaluator determines a similarity measure based on the sub-plurality of the data features. An interaction processor iteratively processes selection of a sub-plurality of the data features based on domain knowledge, and identifies, based on the similarity measures, a cohort of data objects similar to the query object.

15 Claims, 17 Drawing Sheets

(51) Int. Cl.
*G06F 16/248* (2019.01)
*G06F 3/0484* (2013.01)

(58) Field of Classification Search
USPC .................................................. 707/722
See application file for complete search history.

(56) References Cited

U.S. PATENT DOCUMENTS

| | | | |
|---|---|---|---|
| 7,106,903 B2* | 9/2006 | Chang | G06K 9/6212 382/190 |
| 7,873,634 B2 | 1/2011 | Desbiens | |
| 8,024,327 B2* | 9/2011 | Tunkelang | G06F 16/245 707/722 |
| 8,301,638 B2 | 10/2012 | Xu et al. | |
| 8,463,718 B2 | 6/2013 | Ben-Hur et al. | |
| 8,756,229 B2* | 6/2014 | Stockton | G06F 16/316 707/736 |
| 8,775,424 B2* | 7/2014 | Skaff | G06K 9/00664 707/737 |
| 8,856,105 B2* | 10/2014 | Gargi | G06F 16/58 707/722 |
| 9,177,225 B1* | 11/2015 | Cordova-Diba | G06T 5/00 |
| 9,519,859 B2* | 12/2016 | Huang | G06N 3/0454 |
| 9,659,056 B1* | 5/2017 | Chechik | G06F 16/245 |
| 10,055,686 B2* | 8/2018 | Huang | G06N 3/0454 |
| 2002/0002550 A1* | 1/2002 | Berman | G06F 16/2246 |
| 2002/0097914 A1* | 7/2002 | Yaung | G06F 16/5838 382/225 |
| 2002/0110276 A1* | 8/2002 | Kasutani | G06F 16/5838 382/165 |
| 2003/0021481 A1* | 1/2003 | Kasutani | G06F 16/56 382/218 |
| 2003/0088387 A1 | 5/2003 | Chang et al. | |
| 2003/0225750 A1* | 12/2003 | Farahat | G06F 16/951 |
| 2004/0148266 A1* | 7/2004 | Forman | G06K 9/626 706/46 |
| 2008/0240527 A1* | 10/2008 | Keller | G06K 9/00127 382/128 |
| 2008/0288889 A1* | 11/2008 | Hunt | G06Q 30/02 715/810 |
| 2009/0018996 A1* | 1/2009 | Hunt | G06Q 30/02 |
| 2009/0024598 A1* | 1/2009 | Xie | G06F 16/3347 |
| 2009/0106734 A1* | 4/2009 | Riesen | G06N 7/005 717/104 |
| 2010/0332511 A1* | 12/2010 | Stockton | G06F 16/316 707/759 |
| 2011/0106785 A1* | 5/2011 | Loftus | G06F 16/3331 707/706 |
| 2011/0184950 A1* | 7/2011 | Skaff | G06K 9/00664 707/737 |
| 2011/0246409 A1 | 10/2011 | Mitra | |
| 2011/0307477 A1* | 12/2011 | Dasari | G06Q 10/063 707/723 |
| 2012/0278321 A1* | 11/2012 | Traub | G06F 16/3331 707/736 |
| 2013/0218864 A1* | 8/2013 | Hong | G06Q 30/0206 707/709 |
| 2014/0019088 A1* | 1/2014 | Leonard | G06F 17/18 702/178 |
| 2014/0279746 A1 | 9/2014 | De Bruin et al. | |
| 2014/0337258 A1 | 11/2014 | Virkar | |
| 2014/0344115 A1* | 11/2014 | Yatsuda | G06F 16/26 705/26.63 |
| 2015/0016729 A1* | 1/2015 | Cevahir | G06K 9/46 382/195 |
| 2015/0066957 A1* | 3/2015 | Cevahir | G06F 16/24578 707/749 |
| 2015/0074027 A1* | 3/2015 | Huang | G06N 3/0454 706/25 |
| 2015/0149261 A1* | 5/2015 | Walkingshaw | G06Q 10/06395 705/7.41 |
| 2016/0092781 A1* | 3/2016 | Byrnes | G06F 16/2425 706/52 |

OTHER PUBLICATIONS

Wall et al., "Singular Value Decomposition and Principle Component Analysis", in A Practical Approach to Microarray Data Analysis (D.P. Berrar, W. Dubitzky, M.Granzow, Eds.) Kluwer: Norwell, MA, 2003, pp. 91-109. (Year: 2003).*

Mamitsuka, H., "Query-Learning-Based Iterative Feature-Subset Selection for Learning from High-Dimensional Data Sets", Knowledge and Information Systems (2006) 9(1): pp. 91-108. (Year: 2006).*

Shafiei et al., "Document Representation and Dimension Reduction for Text Clustering", in 2007 IEEE 23rd International Conference on Data Engineering Workshop, Apr. 17-20, 2007, pp. 770-779. (Year: 2007).*

Tong et al., "Query-Sensitive Feature Selection for Lazy Learners", in Proceedings of the 2007 IEEE Symposium on Computational Intelligence and Data Mining (CIDM 2007), IEEE, 2007, pp. 59-65. (Year: 2007).*

Laaksonen et al., "Class Distributions on SOM Surfaces for Feature Extraction and Object Retrieval", Neural Networks 17 (2004): pp. 1121-1133, 2004. (Year: 2004).*

Saeys et al., "A Review of Feature Selection Techniques in Bioinformatics", Bioinformatics, vol. 23, No. 19, 2007, pp. 2507-2517. (Year: 2007).*

Barlowe, S. et al, "Multivariate Visual Explanation for High Dimensional Datasets", Oct. 19-24, 2008.

Christian, Seeks at al, "Efficient K-nearest Neighbor Queries with the Signature Quadratic Form Distance", 2010.

Jurgen et al, "Visual-Interactive Exploration of Interesting Multivariate Relations in Mixed Research Data Sets", Jul. 12, 2014.

Tatu, A, et al, "Subspace Search and Visualization to Make Sense of Alternative Clusteringsin High Dimentional Data", Oct. 14-19, 2012.

* cited by examiner

| 1 | Shrt_Desc | 208 | Water_(g) | Energ_Kcal | Protein_(g) | Lipid_Tot_(g) |
|---|---|---|---|---|---|---|
| 2 | BUTTER,WITH SALT | | 15.87 | 717  210 | 0.85 | 81.11 |
| 3 | BUTTER, WHIPPED, W | | 15.87 | 717 | 0.85 | 81.11 |
| 4 | BUTTER OIL, ANHYDR | | 0.24 | 876 | 0.28 | 99.48 |
| 5 | CHEESE, BLUE | | 42.41 | 353 | 21.4 | 28.74 |
| 6 | CHEESE, BRICK | | 41.11 | 371 | 23.24 | 29.68 |
| 7 | CHEESE, BRIE | | 48.42 | 334 | 20.75 | 27.68 |
| 8 | CHEESE, CAMEMBERT | | 51.8 | 300 | 19.8 | 24.26 |
| 9 | CHEESE, CARAWAY | | 38.28 | 376 | 25.18 | 29.2 |
| 10 | CHEESE, CHEDDAR | | 36.75 | 403 | 24.9 | 33.14 |
| 11 | CHEESE, CHESHIRE | | 37.65 | 387 | 23.37 | 30.6 |
| 12 | CHEESE, COLBY | | 38.2 | 394 | 23.76 | 32.11 |
| 13 | CHEESE COTAGE, CR | | 79.79 | 98 | 11.12 | 4.3 |
| 14 | CHEESE COTAGE, CR | | 79.64 | 97 | 10.69 | 3.85 |
| 15 | CHEESE COTAGE, NC | | 81.01 | 72 | 10.34 | 0.29 |
| 16 | CHEESE COTAGE, LO | | 80.69 | 86 | 11.83 | 2.45 |
| 17 | CHEESE COTAGE, LO | | 82.48 | 72 | 12.39 | 1.02 |
| 18 | CHEESE, CREAM | | 54.44 | 342 | 5.93 | 34.24 |

FIG. 2

Top Nearest Neighbors
top 4NN of ABBREV-1-numeric.csv

904

| | euclidean_distance | Shrt_Desc | Water | Energ | Protein | Lipid_Tot |
|---|---|---|---|---|---|---|
| 1 | 0.0 | BUTTER, WITH SALT | 15.87 | 717.0 | 0.85 | 81.11 |
| 2 | 0.011006059019753668 | BUTTER, WHIPPED, WITH SALT | 15.87 | 717.0 | 0.85 | 81.11 |
| 3 | 0.012036974862486439 | BUTTER, WITHOUT SALT | 17.94 | 717.0 | 0.85 | 81.11 |
| 4 | 0.12319457979767782 | BUTTER OIL, ANHYDROUS | 0.24 | 876.0 | 0.28 | 99.48 |

| | Ash | Carbohydrt | Fiber_TD | Sugar_Tot | Calcium | Iron | Magnesium | Phosphorus | Potassium |
|---|---|---|---|---|---|---|---|---|---|
| 1 | 2.11 | 0.06 | 0.0 | 0.06 | 24.0 | 0.02 | 2.0 | 24.0 | 24.0 |
| 2 | 2.11 | 0.06 | 0.0 | 0.06 | 24.0 | 0.16 | 2.0 | 23.0 | 26.0 |
| 3 | 0.04 | 0.06 | 0.0 | 0.06 | 24.0 | 0.02 | 2.0 | 24.0 | 24.0 |
| 4 | 0.0 | 0.0 | 0.0 | 0.0 | 4.0 | 0.0 | 0.0 | 3.0 | 5.0 |

FIG. 9B

Top Nearest Neighbors
top 12NN of ccy01cs105.houston.hp.com_01-30-2014_18-59-arc_mh_host_featureVector.csv

| | eulidean_distance | host_name | sc_filter_result_OBSERVED | sc_filter_result_PROXED |
|---|---|---|---|---|
| 1 | 0.0 | online.wellsfargo.com | 0.0 | 21.0 |
| 2 | 0.010841584216904 | im.rediff.com | 0.0 | 20.0 |
| 3 | 0.021683168433809804 | dashboard1.transerainc.net | 0.0 | 19.0 |
| 4 | 0.03133814119553169 | s.c.lnkd.licdn.com | 0.0 | 23.0 |
| 5 | 0.05074201995969796 | a248.e.akamai.net | 0.0 | 22.0 |
| 6 | 0.05192303242135362 | www.ktvb.com | 0.0 | 24.0 |

| | cs_categories_Adult_Mature_Content | cs_categories | cs_categories_Art_Culture | cs_categories_ |
|---|---|---|---|---|
| 1 | 0.0 | 0.0 | 0.0 | 0.0 |
| 2 | 0.0 | 0.0 | 0.0 | 0.0 |
| 3 | 0.0 | 0.0 | 0.0 | 0.0 |
| 4 | 0.0 | 0.0 | 0.0 | 0.0 |
| 5 | 0.0 | 0.0 | 0.0 | 0.0 |
| 6 | 0.0 | 0.0 | 0.0 | 0.0 |

VISUALLY INTERACTIVE IDENTIFICATION OF A COHORT OF DATA OBJECTS SIMILAR TO A QUERY BASED ON DOMAIN KNOWLEDGE

BACKGROUND

Big data applications, such as recommendation systems, predictive modeling, and pattern recognition, often rely on a search for data objects that are similar to a query object. Feature reduction is a common task in many statistical applications. Data features represented in higher dimensional spaces may exhibit varying levels of sparseness and different types of distributions. Feature reduction allows for extraction of data features that may be of interest.

BRIEF DESCRIPTION OF THE DRAWINGS

FIG. 2 is a table illustrating an example of a data object of FIG. 1, including a plurality of numerical components.

FIG. 9B illustrates an example of a cohort of data objects similar to a query object.

FIG. 10B illustrates another example of a cohort of data objects similar to a query object.

DETAILED DESCRIPTION

Figure 1:
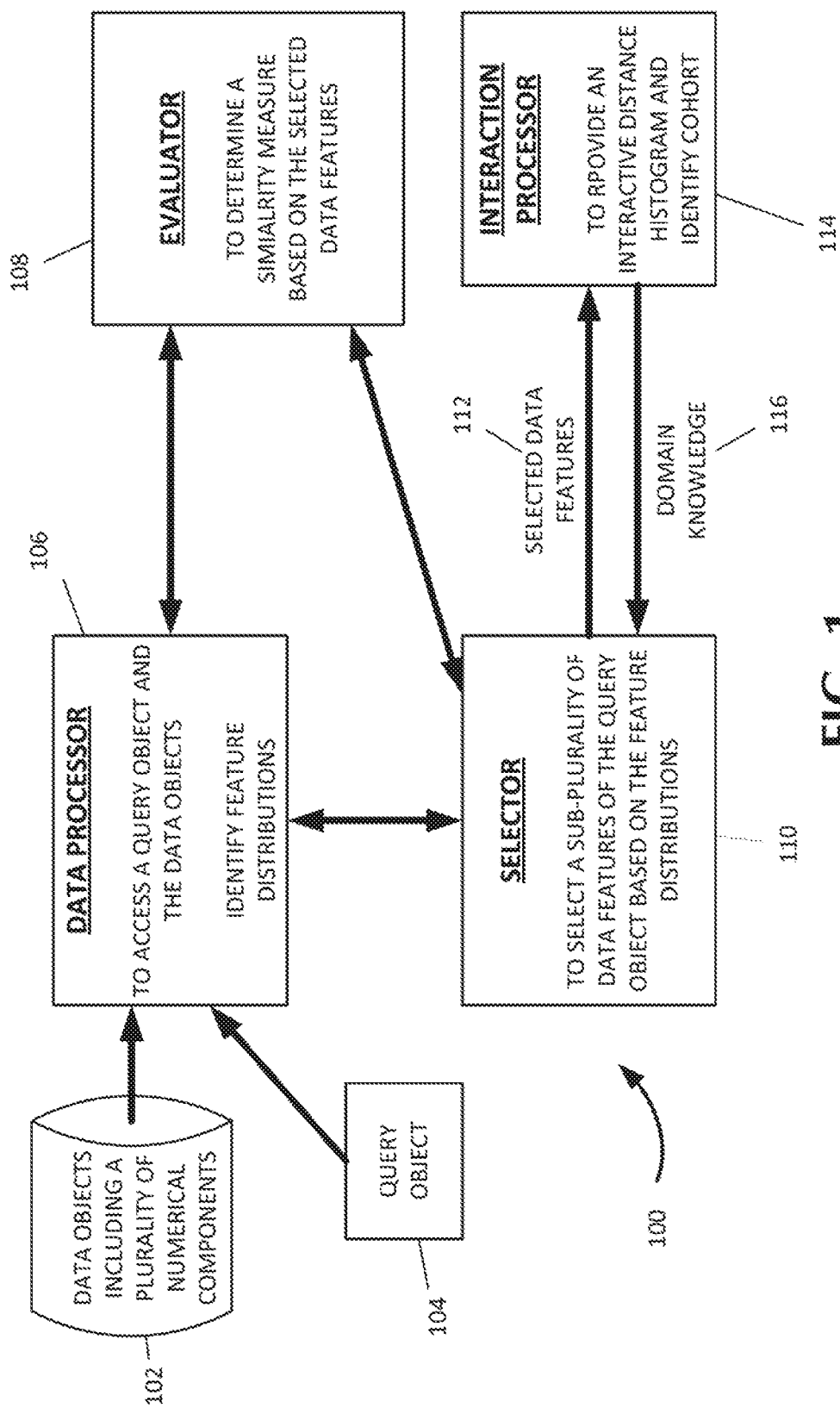
FIG. 1 is a functional block diagram illustrating one example of a system for visually interactive identification of a cohort of data objects similar to a query object based on domain knowledge.

An important task for many big data applications such as in recommendation systems, predictive modeling, and pattern recognition, is a search for data objects similar to a query object. Real world use cases include, for example, physicians who may want to find patients with similar symptoms to a patient being treated, or a cyber-security expert who discovers a single malicious website and wishes to use that site to discover other potential malicious sites. Many such applications and use cases may rely on availability of a distance measure that may differentiate among different data objects.

In predictive models, step forward or step backward approaches may be utilized to determine a subset of features that captures variability in the models. In principal components analysis, transformation of data into a set of orthogonal principal components may identify a subset of features that captures variability in the data. However, distance measures such as the Euclidean distance, Manhattan distance, or Cosine Similarity may not perform well with high dimensional datasets, (e.g., greater than 20 dimensions). Such high dimensional data is often sparse, making differentiation among objects more difficult to detect. While large sample sizes may ameliorate this problem, in many real world situations, sufficient sample sizes may not be available. For example, in microarray gene analysis the "small n large p" problem is common—the sample size, which is often in the hundreds or few thousands, is small relative to the number of dimensions, which may be tens of thousands of single nucleotide polymorphisms. Similarly, in clinical data, the number of patients with a particular disease of interest may be small relative to the number of clinical dimensions measured. In such examples, the challenge is to develop an approach that allows discovery of a subset (or subspace) of dimensions that may perform optimally with different machine learning methods.

Accordingly, feature reduction is a common task in such big data applications. In predictive models, step forward or step backward approaches may be utilized to determine a subset of features that captures variability in the models. Commonly used tests to compare models include the global F test, or the likelihood ratio. In principal components analysis ("PCA"), transformation of data into a set of orthogonal principal components may identify a subset of features that captures variability in the data. Least angles regression is another feature reduction algorithm that improves on conventional step forward approaches by finding a subset of features (along with parameter estimates) that most closely matches the direction of the model residuals.

Generally, existing methods for feature reduction allow minimal input by end users. Methods such as step-forward or step-backward regression modeling are completely automated, as is the selection of principal components in PCA. Also, for example, selection of dimensions may not be tailored to the query object. The interpretation of the selected features may be left to the end-user at the end of the automated process, making it difficult for the user to understand how the features were selected, how they may be relevant to the user's needs, or what they may mean in a real world application. As another example, there may be an absence of interactive visual analytics to validate search results based on the feature reduction. These methods are often designed to be applied to relatively large sample sizes of data. For example, a regression model predicts an outcome for an individual based on a 'best fit' with population data, and the model parameters are selected to work with any of the objects within a dataset.

The interactive approach described herein is based on a visual analytics workflow design to find nearest-neighbors (cohort) to a single query object in a high dimension spaces. Generally, a three-step workflow computes a dimension interestingness measure to automatically select interesting dimensions relevant to the query object for performing dimension reduction. Such a selection of dimensions is enhanced with expert domain knowledge to add and/or delete interesting dimensions that may be meaningful to an end user. A visual interactive analytics technique based on a distance measure curve is linked with a "list of cohort (nearest neighbors)" ordered by a similarity of objects in the cohort. This visual analytics workflow is iterative for domain experts to validate and refine their hypotheses.

For example, a domain expert may be interested in analyzing a high-dimensional dataset such as a nutrient database to identify a cohort for "butter with salt", and "peanut" from the nutrient database. As another example, a domain expert, such as a network administrator, may be interested in analyzing a high-dimensional dataset such as a big cyber security database to find a client internet protocol ('IP') cohort with 12 selected dimensions in a real security data of over 500 dimensions. For example, the network administrator may be interested in anomalous client IPs similar to a given anomalous client IP. Also, for example, a physician may search for patients (in a large dataset of patients) having attributes similar to a patient being treated by the physician. The interactive approach described herein offers an efficient and rapid process that enables injection of domain knowledge into the analytics workflow, thus potentially increasing the relevance of generated search results.

As described in various examples herein, a visually interactive identification of a cohort of data objects similar to a query object based on domain knowledge is disclosed. One example is a system including a data processor, an evaluator, a selector, and an interaction processor. The data processor accesses a plurality of data objects, each data object comprising a plurality of numerical components, where each component represents a data feature of a plurality of data features. The data processor identifies, for each data feature, a feature distribution of the components associated with the data feature. The selector selects a sub-plurality of the data features of the query object, where a given data feature is selected if the component representing the given data feature is a peak for the feature distribution of the given data feature. The evaluator determines, for a query object and a data object, a similarity measure based on the sub-plurality of the data features, the similarity measure indicative of data features common to the query object and the data object. The interaction processor provides, via an interactive graphical user interface, an interactive visual representation of a distance histogram, iteratively processes, based on the interactive distance histogram, selection of a sub-plurality of the data features, the selection based on domain knowledge, and identifies, based on the similarity measures, a cohort of data objects similar to the query object.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for visually interactive identification of a cohort of data objects similar to a query object based on domain knowledge. System 100 is shown to include a data processor 106, an evaluator 108, a selector 110, and an interaction processor 114.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the internet, part of an intranet, and/or any other type of network.

The system 100 accesses a plurality of data objects, each data object comprising a plurality of numerical components, where each component represents a data feature of a plurality of data features, and identifies, for each data feature, a feature distribution of the numerical components. The system 100 selects a sub-plurality of the data features of the query object, wherein a given data feature is selected if the component representing the given data feature is a peak for the feature distribution of the given data feature. The system 100 determines, for a query object and a data object, a similarity measure based on the sub-plurality of the data features, the similarity measure indicative of data features common to the query object and the data object. The system 100 provides, via an interactive graphical user interface, an interactive visual representation of a distance histogram. The system 100 iteratively processes, based on the Interactive distance histogram, selection of a sub-plurality of the data features, the selection based on domain knowledge, and identifies, based on the similarity measures, a cohort of data objects similar to the query object.

System 100 includes a data processor 106 to access a plurality of data objects 102, each data object comprising a plurality of numerical components, where each component represents a data feature of a plurality of data features. Generally, the plurality of data objects 102 describes contents of a high-dimensional dataset. In some examples, the plurality of data objects 102 may be real security data with over 500 dimensions. In some examples, the plurality of data objects 102 may be representative of a nutrient database that may include 8500 different data objects, each data object corresponding to a food item, and 50 different numerical components associated with each of the 8500 food items. In some examples, the plurality of data objects 102 may be representative of customer transactions, Web navigation logs (e.g. click stream), security logs, and/or DNA sequences. In some examples, plurality of data objects 102 may be representative of a high-dimensional dataset of patients, or a high-dimensional dataset of books. For example, each data object may represent a food item, IP address, and so forth, and each component of the data object may be numerical values associated with a data feature.

Query object 104 is a data object. In some examples, query object 104 may be provided by a user. In some examples, query object 104 may be "butter with salt" in a high-dimensional food dataset or a client IP address "16.17 . . . " in a high-dimensional security dataset.

FIG. 2 is a table illustrating an example of a data object 102 of FIG. 1, including a plurality of numerical components. The first column lists various data objects (e.g., food items), such as, for example, "Butter, with Salt", "Butter, Whipped", "Butter Oil, Anhydrate", "Cheese, Blue", Cheese, Brick", and so forth. The second column lists, for example, the Water content (measured in grams) in the food item. The third column lists, for example, the Energy content (measured in Kilo calories or Kcal) in the food item, and so on. For example, "Butter, with Salt" has 15.87 grams of Water, 717 Kilo calories of Energy, 0.85 grams of Protein, 81.1 grams of Total lipids, 2.11 grams of Ash, 0.06 grams of Carbohydrate, 0 grams of Fiber, 0.06 grams of Sugar, 24 milligrams of Calcium, and so forth.

More specifically, column 212 lists a plurality of data objects. Each data object is associated with a plurality of data features, such as a first data feature 202 for "Water_(g)", a third data feature 204 for "Protein_(g)", and so forth. For example, a first data object 200 "Butter, With Salt", is associated with numerical components for each of the data features, such as, for example, a first component 208 with value "15.87" corresponding to the first data feature 202 for "Water_(g)", and a third component 210 with value "0.85" corresponding to the third data feature 204 for "Protein_(g)", and so forth. Also, as illustrated, first column 206 lists a plurality of numerical components associated with the first data feature 202 for "Water_(g)". Likewise, each column is a list of a plurality of numerical components associated with a data feature.

Referring to FIG. 1, data processor 106 identifies, for each data feature, a feature distribution of the numerical components. The feature distribution may be a statistical distribution of the components associated with the data feature. For example, data processor 106 may identify a first feature distribution for the first data feature 202 for "Water_(g)" based on the plurality of numerical components associated with the first data feature 202, and displayed in the first column 206. Likewise, data processor 106 may identify a second feature distribution for the second data feature for "Energy_(Kcal)" based on the plurality of numerical components associated with the second data feature, and displayed in the second column. Also, for example, data processor 106 may identify a third feature distribution for the third data feature 204 for "Protein_(g)", based on the plurality of numerical components associated with the third data feature 204, and displayed in the third column. Generally, the distribution may be a probability distribution, such as, for example, uniform, quasi-uniform, normal, long-tailed, or heavy-tailed.

Referring to FIG. 1, system 100 may include a selector 110 to select a sub-plurality of the data features of the query object, where a given data feature is selected if the component representing the given data feature is a peak for the feature distribution of the given data feature. The term "peak", as used herein, may refer to a rare event, unexpected or remarkable event. For example, the peak may be identified as a numerical value that deviates from an expectation of a probability distribution by a threshold value. In some examples, the peak may be identified based on an expectation of a probability distribution. For example, a mean of a normal distribution may be the expectation, and a threshold deviation from this mean may be utilized to determine the peak for this distribution.

In some examples, the peak may be based on a domain. For example, the distribution may be based on the domain, and an expectation or mean of the distribution may be indicative of an expected event. A deviation from this mean may be indicative of a peak. Also, for example, a peak in log messages related to security, may be different from a peak in log messages related to healthcare data. In some examples, a domain expert may provide feedback data based on domain knowledge 116 that may enable automatic identification of peaks. For example, repeated selection of a component and/or data feature by a domain expert may be indicative of a peak.

A domain may be an environment associated with the plurality of data objects, and domain knowledge may be semantic and/or contextual knowledge of a domain expert relevant to aspects of the domain. For example, the plurality of data objects 102 may be related to customer transactions, and the domain may be a physical store where the customer transactions take place, and domain knowledge may be related to number and types of items purchased at the physical store. As another example, the plurality of data objects 102 may be representative of Web navigation logs (e.g. click stream), and the domain may be the domain name servers that are visited via the navigation logs, and domain knowledge may relate to analysis of internet traffic. Also, for example, the plurality of data objects 102 may be related to operational or security logs, and the domain may be a secure office space for which the security logs are being maintained and/or managed, and domain knowledge may relate to tracking security logs based on preferences such as location, time, frequency, error logs, warnings, and so forth.

Generally, domain knowledge may be domain knowledge. For example, the domain may be a retail store, and the domain knowledge may relate to the store manager's expertise. Also, for example, the domain may be a hospital, and the domain knowledge may related to expertise of a member of the hospital management staff. As another example, the domain may be a casino, and the domain knowledge may be the casino manager's expertise. Also, for example, the domain may be a secure office space, and the domain knowledge may be expertise of a member of the security staff.

In some examples, system 100 includes an evaluator 108 to determine, for a query object 104, and a data object of the plurality of data objects, a similarity measure based on the selected sub-plurality of the data features, the similarity measure indicative of data features common to the query object and the data object. In some examples, the similarity measure may be Euclidean distance, as described herein (e.g., when the number of data features is less than or equal to 8). In some examples, the similarity measure may be a dimension interestingness measure for higher dimensional data objects (e.g., when the number of data features is more than 8).

The dimension interestingness measure is utilized to facilitate an automatic selection of a dimension to a query object 104 in a high dimensional space. The dimension interestingness measure highlights the dimensions (or data features) that are most relevant to the query object 104. This facilitates an automatic reduction of dimension. In some examples, the dimension interestingness measure may be determined by shifting data records to the right side. In some examples, the dimension interestingness measure may be determined based on a bi-modal distribution.

System 100 includes an interaction processor 114 to provide, via an interactive graphical user interface, an interactive visual representation of a distance histogram, and to iteratively process, based on the interactive distance histogram, selection of a sub-plurality of the data features, the selection based on domain knowledge, and identify, based on the similarity measures, a cohort of data objects similar to the query object.

The histogram may be utilized to automatically determine a selection of an interesting dimension for the query object 104 in a high dimensional space. The x-axis of the histogram represents normalized distance between a data object and the query object 104 on each individual dimension similarity distance to the query object 104; and the y-axis represents frequency count.

Figure 3A:
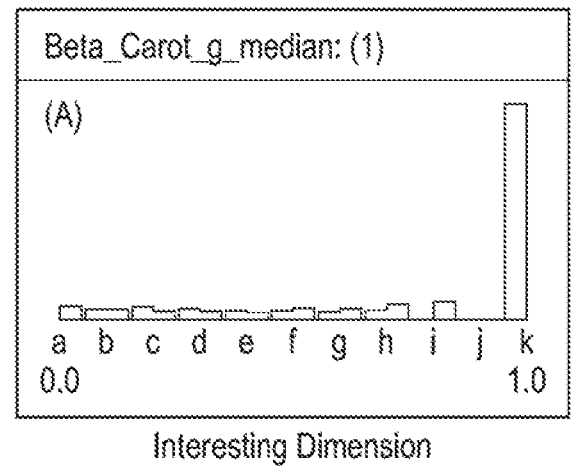
FIGS. 3A-3C illustrate examples of interesting and non-interesting dimensions.
Figure 3B:
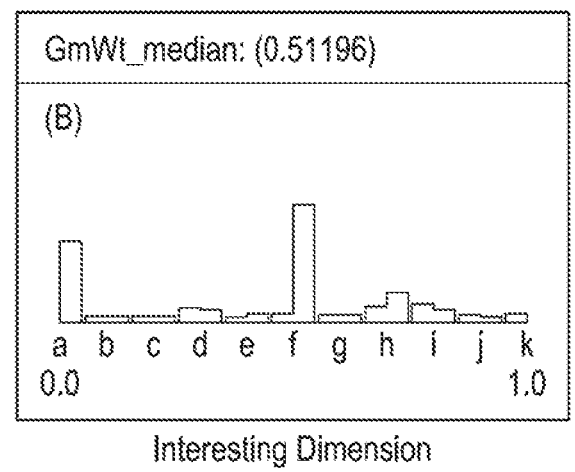
Figure 3C:
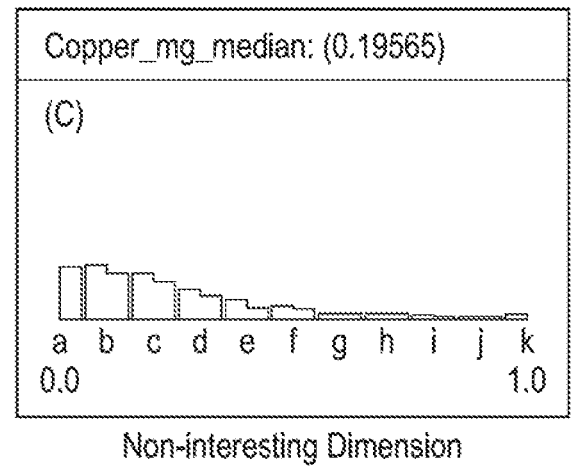

FIGS. 3A-3C illustrate examples of interesting and non-interesting dimensions. Histograms 3 (A) and 3 (B) illustrate interesting dimensions where the distance histograms have notable peaks, whereas Histogram 3 (C) illustrates a non-interesting dimension where the distance histogram does not have any peaks.

Figure 4A:
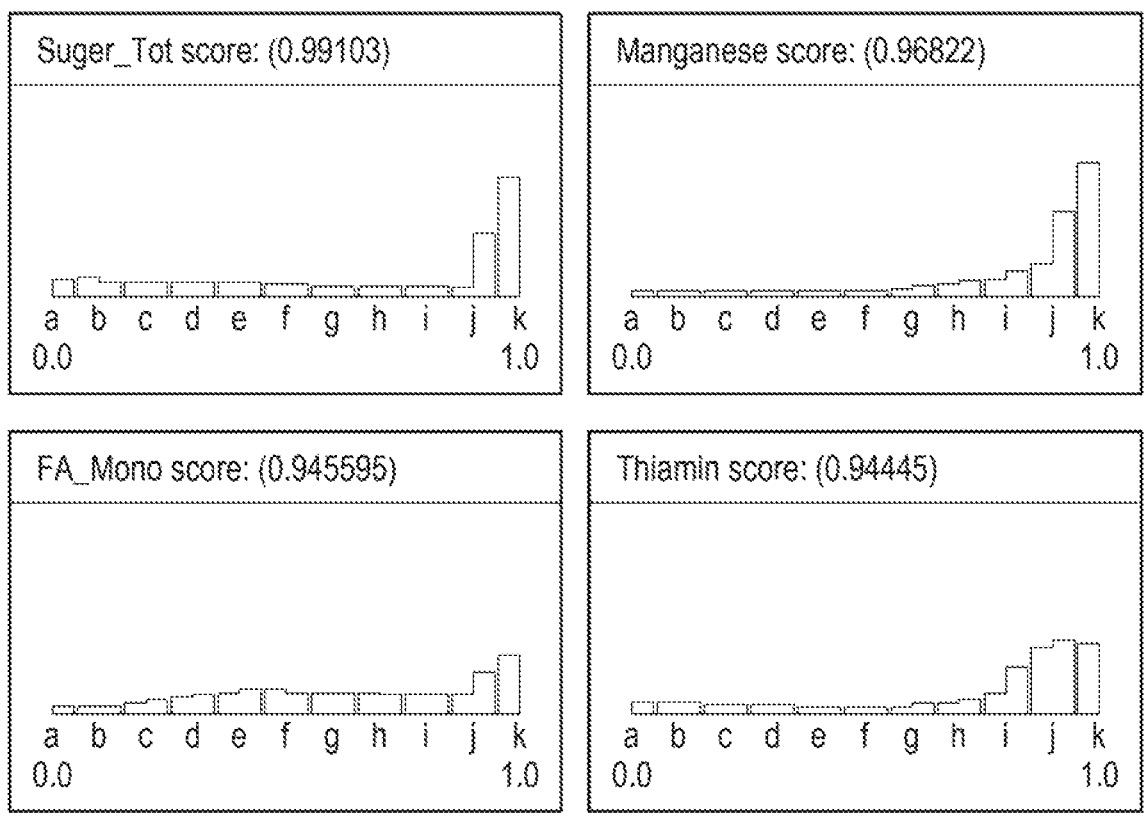
FIGS. 4A-4D illustrate examples of providing a visual representation of the dimension interestingness measure.
Figure 4B:
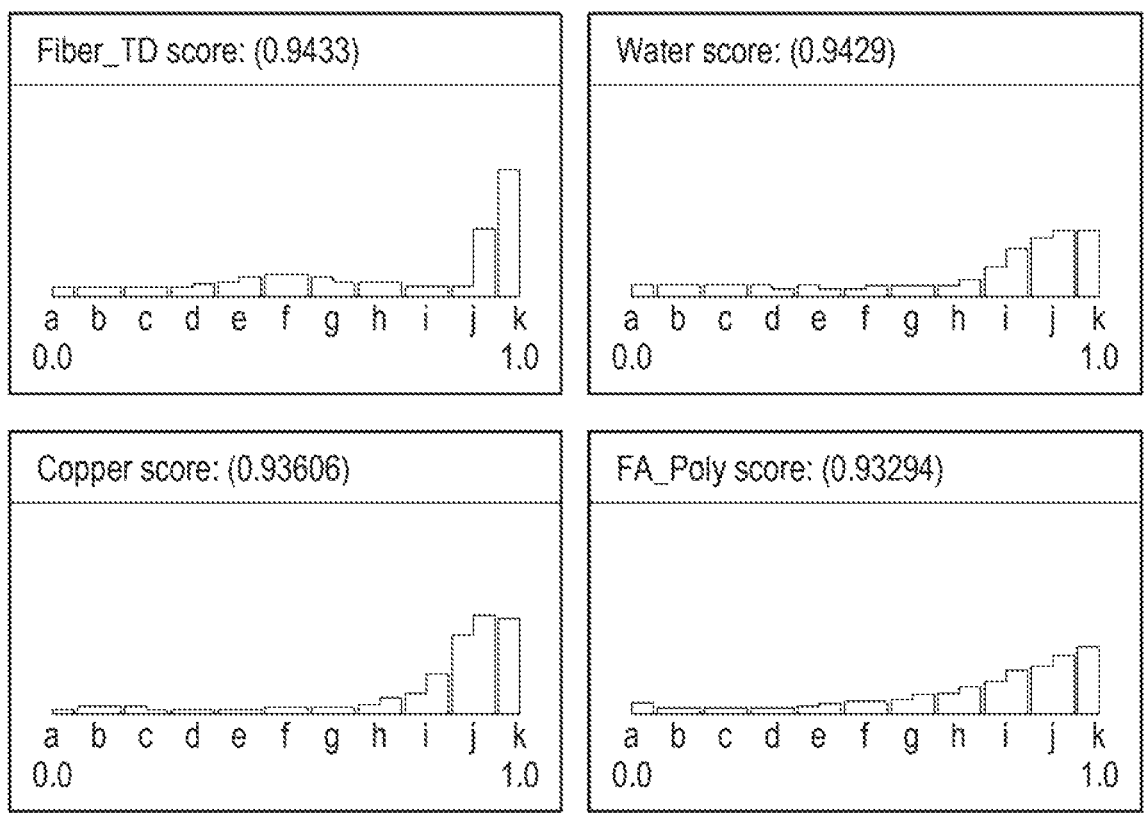

FIGS. 4A-4D illustrate examples of providing a visual representation of the dimension interestingness measure. In particular, FIGS. 4A-4D illustrate examples of dimension interestingness measures sorted based on relative values. FIGS. 4A and 4B provide examples of a visual representation of the dimension interestingness measure representing an automatically selected sub-plurality of the data features of the query object. As illustrated in FIGS. 4A and 4B, the peaks are to the left and therefore represent interesting dimensions.

Figure 4C:
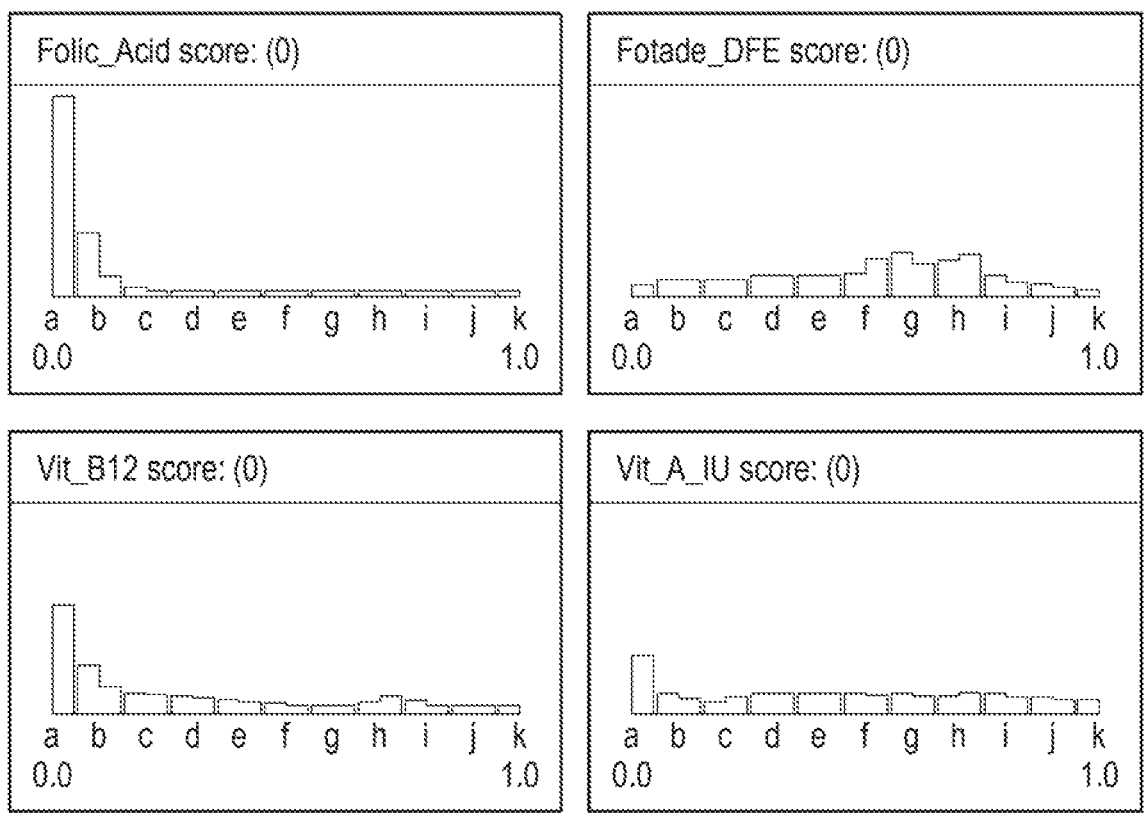
Figure 4D:
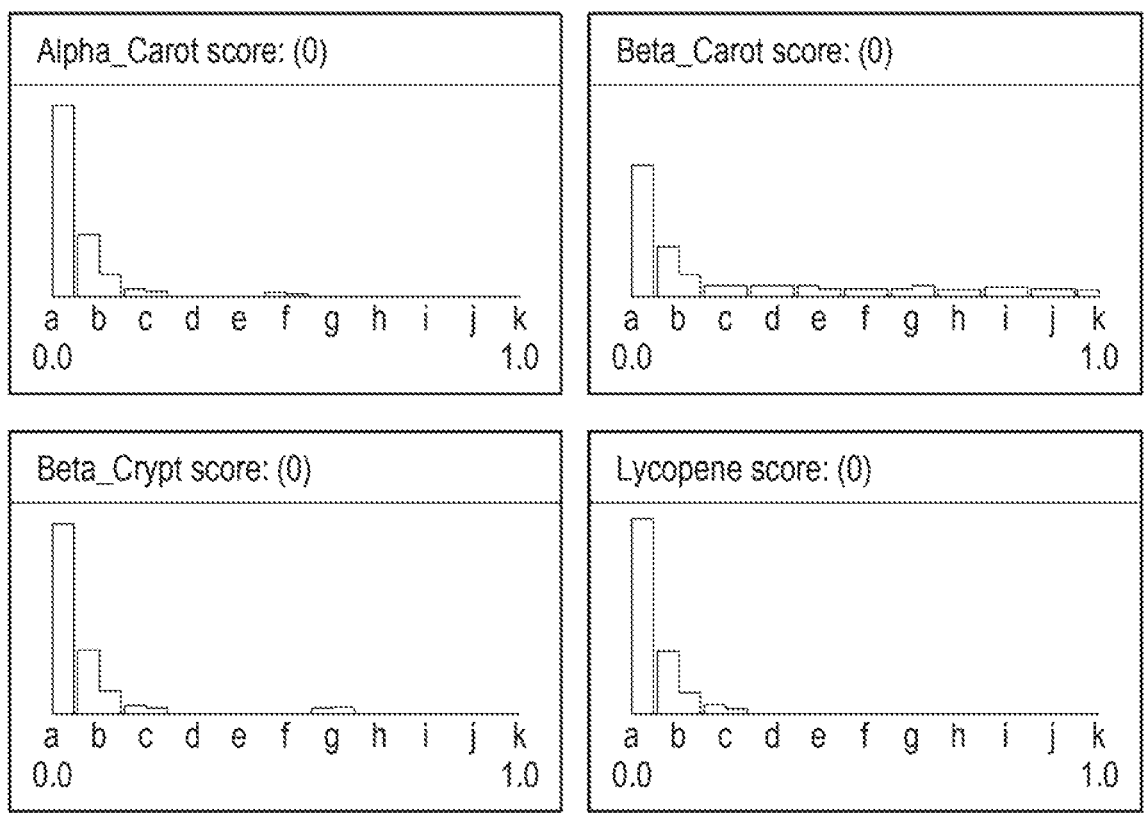

On the other hand, FIGS. 4C and 4D provide examples of a visual representation of the dimension interestingness measure representing a sub-plurality of the data features of the query object that are not automatically selected by system 100. As illustrated in FIGS. 4C and 4D, the peaks are not to the left and therefore represent non-interesting dimensions. However, a domain expert may iteratively select a sub-plurality of the data features. For example, the domain expert may find a component interesting, and may select the component. In some examples, system 100 may update the dimension interesting measure based on such interaction with the domain expert.

In some examples, the evaluator 108 may detect a peak in the distance histogram by identifying a bin with a small width. The narrow bins may represent a peak while wider bins may represent a sparse area.

Figure 5:
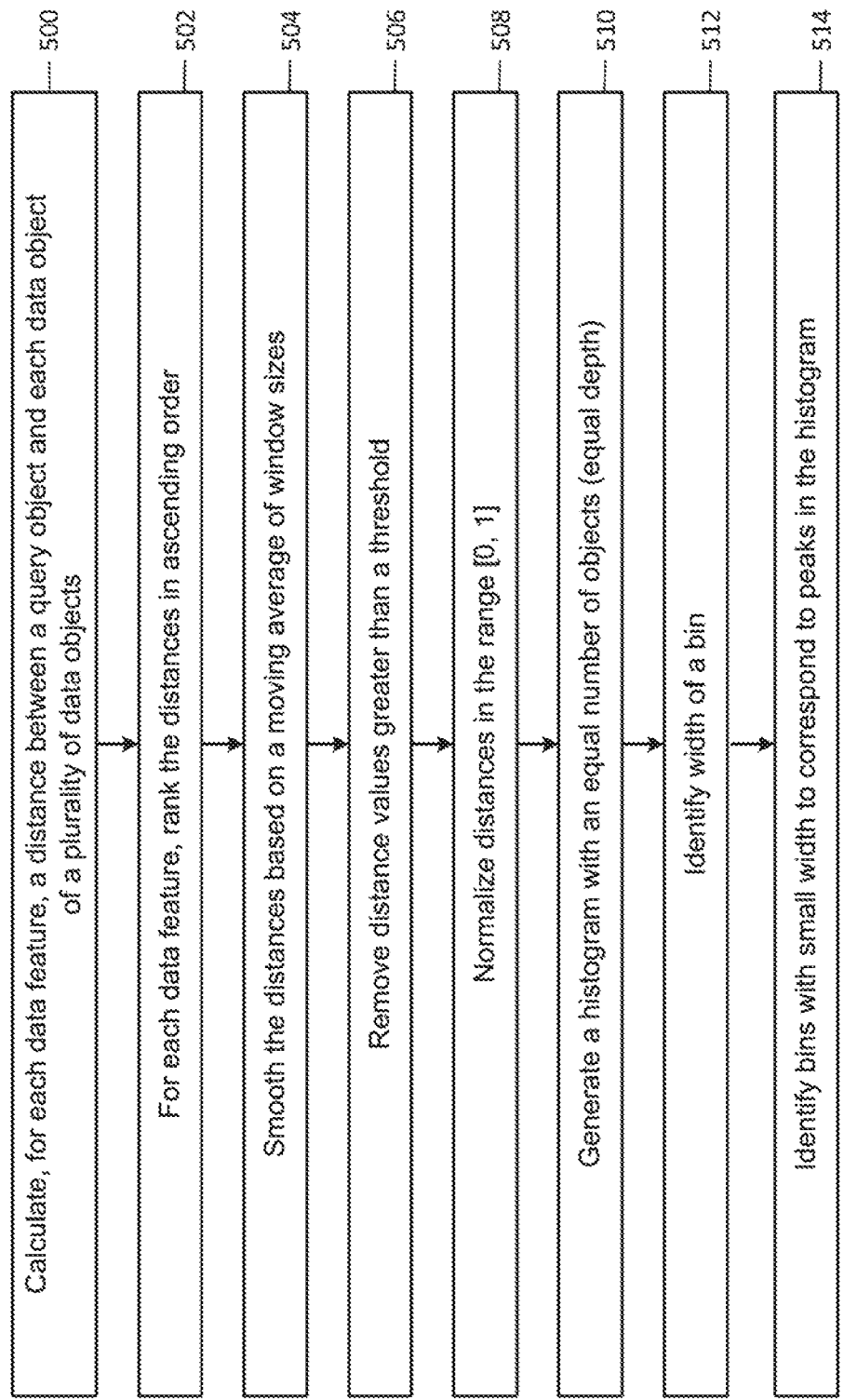
FIG. 5 is a flow diagram illustrating an example of a method for detecting peaks in a distance histogram.

FIG. 5 is a flow diagram illustrating an example of a method for detecting peaks in a distance histogram. At 500, for each data feature, a distance is determined between the query object and each data object of the plurality of data objects. At 502, the distances are ranked in ascending order. At 504, distances are smoothed based on a moving average of window sizes. In some examples, smoothing may be achieved by determining an average value of window sizes for previous values. In some examples, at 504, a pseudo-code may be utilized as follows:

```
private void smooth(final double[ ] array, final int
    windowSize) {
  final int size = array.length;
  for (int i = windowSize − 1; i < size; i++) {
    // calc the average of the current value and the window−1
previous
    // values
    double sum = 0;
    for (int k = 0; k < windowSize; k++) {
      sum += array[i − k];
    }
    array[i] = sum / windowSize;
  }
}
```

At 506, distances greater than a threshold are removed. In some examples, all distances greater than 0.9 percentile may be removed. In some examples, such removal facilitates removal of outlier values. At 508, all distances are normalized logarithmically or linearly in the range [0,1]. Accordingly, the distances are now expected to be equally distributed, with each bin of the histogram having the same width.

At 510, a new histogram is generated where each bin of the new histogram has an equal number of objects. For example, the histogram may be divided into bins that have the same width (same number of data objects).

At 512, the width of a bin may be identified. If all bins are as expected each bin has an equal number of objects), then the distances are equally distributed. This may be indicative of a non-interesting dimension (or data feature). In some examples, the width of a bin may be determined by dividing the histogram into equal ranges. It may be assumed that the distance values are uniformly distributed. For example, for k=5, the interval [0, 1] may be sub-divided into 5 sub-intervals [0.0, 0.2], [0.2, 0.4], [0.4, 0.6], [0.6, 0.8], and [0.8, 1.0]. Each sub-interval may be interpreted as a uniformly distributed probability density function. The expected value within the interval is then (a+b)/2 and the variance is equal to (b−a)*(b−a)/12. Accordingly, the standard deviation for the above given intervals may be determined as 0.058. Based at least in part on this, a bin may be determined to be small if the width of the bin is smaller than (b−a)−2s, and large, if width of the bin is larger than (b−a)+2s.

At 514, bins with a small width may be determined to correspond to peaks in the histogram. If all bins are as expected, then the distances are equally distributed, which is indicative of the fact that the data feature (or dimension) is non-interesting. On the other hand, bins with a significant smaller width represent a peak in the distance distribution, bins with a larger width indicate that between the boundaries of the bin, the values are very sparse. Possible positions of a peak may be identified. For example, a single peak may be identified by taking a distance between the center of the bin containing the peak and "0".

Figure 6:
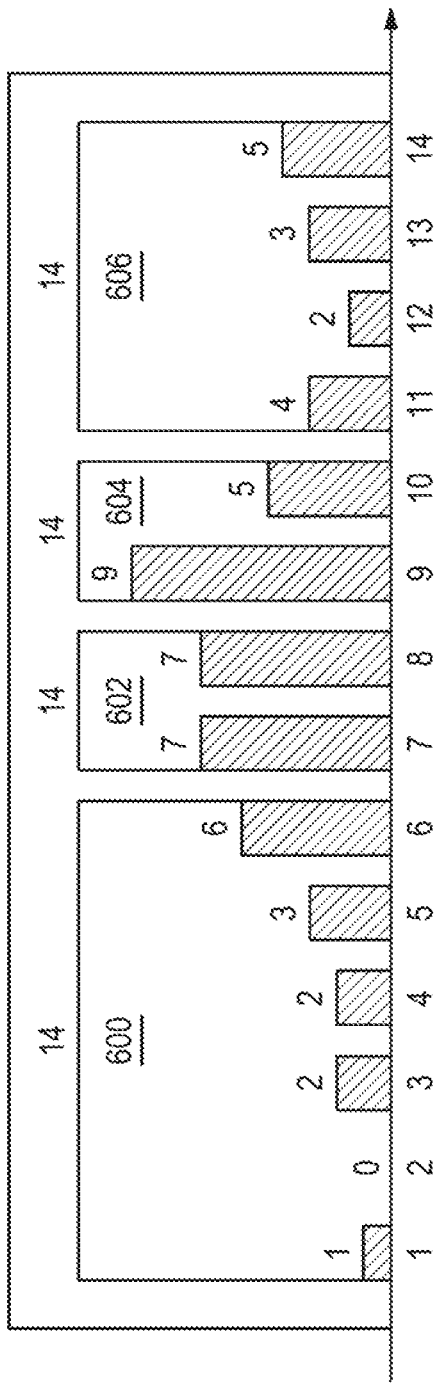
FIG. 6 illustrates an example of identifying a peak in a distance histogram.

FIG. 6 illustrates an example of identifying a peak in a distance histogram. In some examples, the narrow bins represent a peak while wider bins represent a sparse area. In some examples, the interactive distance histogram is a distance histogram with equal depth. Equal depth refers to partitions of a histogram into groups with an equal number of data elements. For example, the y-axis represents frequency count, and the bars of the histogram may be grouped together so that each group has the same total frequency count.

As illustrated in FIG. 6, the distance histogram has equal depth with 14 data objects, i.e., total frequency count in each bin or group is 14. The horizontal axis represents a distance to the query object; and the vertical axis represents the number of data objects. The four bins, 600, 602, 604, and 606 have the same number of data objects. However, the first bin 600 and fourth bin 606 are wider, and therefore do not include peaks. On the other hand, the second bin 602 and the third bin 604 are narrow bins, thereby representing peaks of the histogram. As described herein, evaluator 108 detects such peaks in the distance histogram by identifying bins with a small width.

In some examples, evaluator 108 further determines a component score for each data feature of the sub-plurality of the data features, the component score based on a position of a detected peak in the distance histogram.

Figure 7:
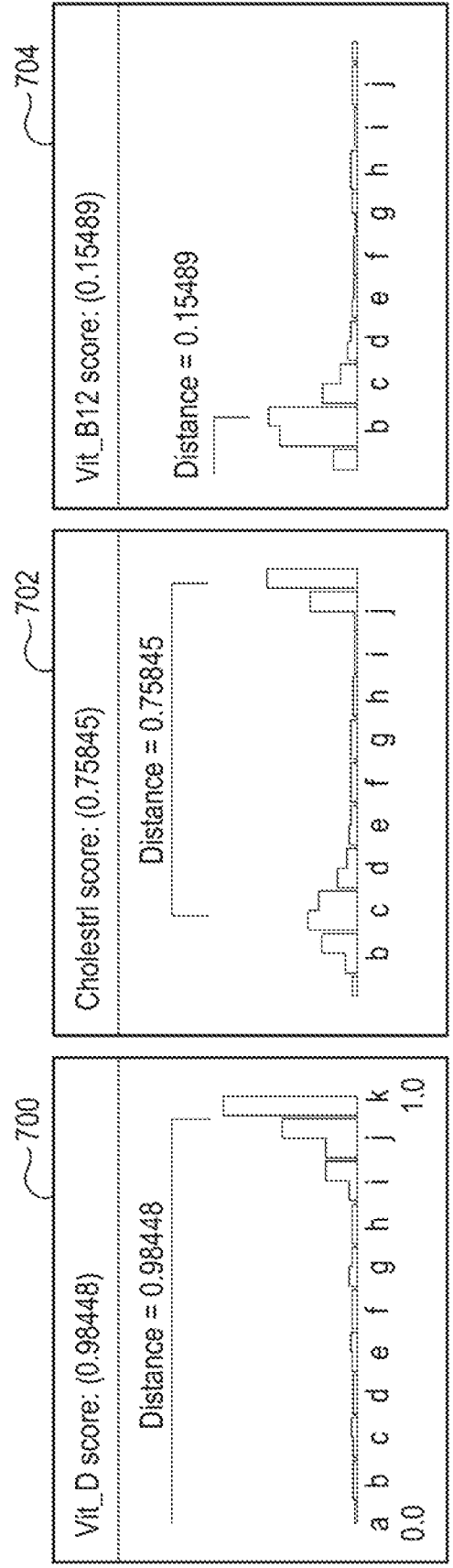
FIG. 7 illustrates examples of determining a component score for each data feature of the sub-plurality of the data features.

FIG. 7 illustrates examples of determining a component score for each data feature of the sub-plurality of the data features. In some examples, the distance between the center of the bin containing the peak and "0" may be utilized to compute the dimension interestingness measure. For example, in the first distance histogram 700, the distance between the center of the bin containing the single peak and "0" may be determined as 0.98448. Likewise, in the third distance histogram 704, the distance between the center of the bin containing the single peak and "0" may be determined as 0.15489. In some examples, the distance between the centers of bins containing two peaks may be utilized to determine the component score. For example, in the second histogram 702, the distance may be determined as 0.75845. In some examples, evaluator 108 ranks the components of the sub-plurality of the data features based on the component scores.

In some examples, the evaluator 108 further determines, for a given data feature, a Euclidean distance distribution between the query object and the plurality of data objects, the Euclidean distance distribution indicative of data objects similar to the query object for the given data feature. In some examples, a normalized Euclidean distance distribution may be determined, where the x-axis is a range of all objects, and the y-axis is a normalized Euclidean distance.

Figure 8A:
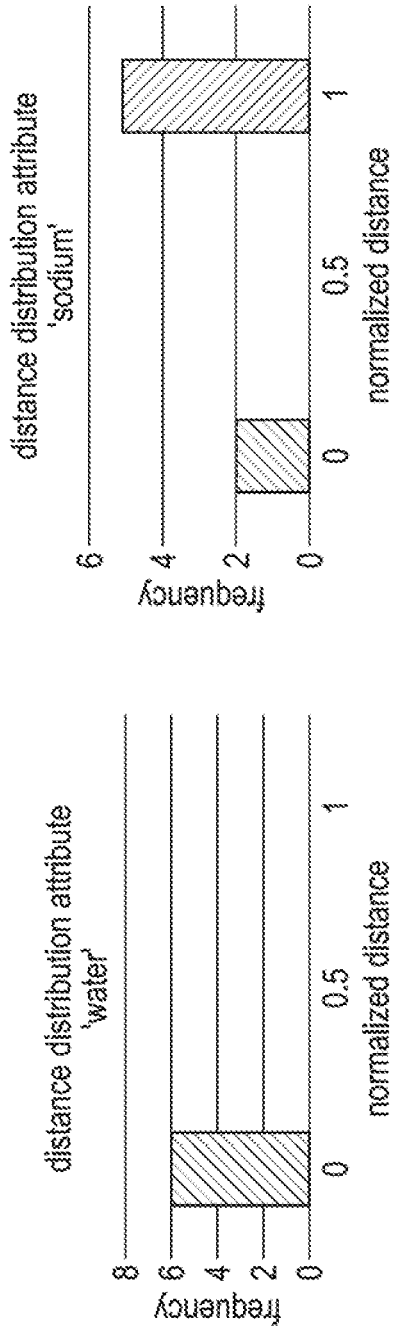
FIG. 8A illustrates examples of Euclidean distance distributions.

FIG. 8A illustrates examples of Euclidean distance distributions. The table illustrated in FIG. 8A provides example data from a nutrient database. The first column lists data objects (e.g., products) such as "Turkey Meat", "Pork Meat", "Milk", "Butter", "Cheese", "Coke", and "Chips". In this example, "Turkey Meat" may be the query object. The second column lists numerical components for the data feature "Water". The third column lists numerical components for the data feature "Sodium". This is an example of data objects with two data features. When the number of data features is 8 or less, the Euclidean distance me be used as the similarity measure. As illustrated, the fourth column determines the Euclidean distance to the query object "Turkey Meat" for the data feature "Water". In some examples, the distance may be determined by taking the difference between the respective numerical components of the data objects and the query object. For example, the Euclidean distances between each data object "Turkey Meat", "Pork Meat", "Milk", "Butter", "Cheese", "Coke", and "Chips", to the query object "Turkey Meat" for the data feature "Water" is 5−5=0. Likewise, the Euclidean distances between each data object "Turkey Meat", "Pork Meat", "Milk", "Butter", "Cheese", "Coke", and "Chips", to the query object "Turkey Meat" for the data feature "Sodium" is 5−5=0, 5−4.5=0.5, 10−5=5, 10−5=5, 10−5=5, 10−5=5, and 10−5−=5, respectively.

Figure 8B:
FIGS. 8B-8C illustrate examples of distance distribution attributes based on the Euclidean distance distributions illustrated in FIG. 7A.
Figure 8C:

FIGS. 8B-8C illustrate examples of distance distribution attributes based on the Euclidean distance distributions illustrated in FIG. 8A. For example, FIG. 8B illustrates the distance distribution attribute for the query object "Turkey Meat" and for the data feature "Water". The x-axis of the distance distribution attribute represents the normalized Euclidean distance, whereas the y-axis represents the frequency. As indicated, "Water" corresponds to six values of "0", thereby having a normalized Euclidean distance of "0" with a frequency of "6".

For example, FIG. 8C illustrates the distance distribution attribute for the query object "Turkey Meat" and for the data feature "Sodium". The x-axis of the distance distribution attribute represents the normalized Euclidean distance, whereas the y-axis represents the frequency. "Sodium" corresponds to a value of "0", a value of 0.5 (normalized to "0"), and five values of "5" (normalized to "1"), thereby having a normalized Euclidean distance of "0" with a frequency of "2", and a normalized Euclidean distance of "1" with a frequency of "5".

Accordingly, the data feature "Water may not be considered interesting for the query object "Turkey Meat" because "Water" is common to all data objects (or products). On the other hand, the data feature "Sodium" may be considered interesting for the query object "Turkey Meat" because 'Sodium' is only present in "Turkey Meat" and "Pork Meat". Accordingly, selector 110 may select Turkey Meat" and "Pork Meat" as the sub-plurality of data features that are relevant to the query object "Turkey Meat".

As described herein, selector 110 selects a sub-plurality of the data features of the query object, wherein a given data feature is selected if the component representing the given data feature is a peak for the feature distribution of the given data feature. Accordingly, the query object, representative of a higher-dimensional vector, may be reduced to a lower dimensional vector based on the selected sub-plurality of the data features of the query object.

As described herein, the interaction processor 114 iteratively processes, based on the interactive distance histogram, selection of a sub-plurality of the data features, the selection based on domain knowledge 116. Generally, the domain knowledge 116 may be domain knowledge of a domain expert. The interaction processor 114 processes the interaction with the computing device to enable the domain expert to explore interesting patterns and incorporate domain knowledge 116 in the form of constraints into the next iteration of the selection of data objects. For example, the domain may be a retail store, and the domain knowledge 116 may include knowledge about traffic patterns in the store, customer purchases, product placement, products sold, available inventory, clientele, store hours, and so forth. In some examples, the graphical user interface provided by the interaction processor 114 is an interactive visual representation of the sub-plurality of data objects. For example, to enable the domain expert to better understand and discover relevant dimensions in the data objects 102, interaction processor 114 may provide a context-augmented interface for visually guided exploration.

In some examples, the iterative selection may include at least one of adding a first data feature to the sub-plurality of data features and deleting a second data feature from the sub-plurality of data features. For example, the interaction processor 114 may interact with, via the computing device, a domain expert such as, for example, a nutritionist. For example, the nutritionist may be interested in finding data objects that are similar to a query object "Turkey Meat" for a data feature "Sodium". Selector 110 may provide a sub-plurality of the plurality of data objects based on dimension interestingness measures. Interaction processor 114 may provide the selected sub-plurality of data features 112 such as "Sodium" and "Water" via, for example, an interactive graphical user interface. In some examples, the nutritionist may review the results and decide to add a first data feature "Butter with Salt", based on domain knowledge. In some examples, the nutritionist may review the results and decide to delete a second data feature "Water", based on domain knowledge. The nutritionist interacts with the computing device via the interactive graphical user interface to provide the added and/or deleted selected data features 112 to the interaction processor 114. The interaction processor 114 may in turn provide the added and/or deleted data objects to selector 110. Selector 110 may be in communication with the data processor 106 (illustrated in FIG. 1 by a bi-directional arrow) to access the added selected data features 112 from the data processor 106, and provide them to the interaction processor 114.

In some examples, interaction processor 114 may receive indication of addition of the first data feature "Water", and prompt the evaluator 106 to increase the dimension interestingness measure for "Water". In some examples, interaction processor 114 may receive indication of deletion of the second data feature "Calcium", and prompt the evaluator 106 to decrease the dimension interestingness measure for 'Calcium'. In some examples, interaction processor 114 may provide the sub-plurality of data features 112 to the computing device. In general, the iterative process may be repeated by the interaction processor 114 as long as the interaction processor 114 does not receive an indication (e.g., from the domain expert via the computing device) of being satisfied with the sub-plurality of data features 112. In some examples, the process may terminate when no data features (or interesting dimensions) are identified as selected.

In some examples, the interaction processor 114 may identify, based on the similarity measures, a cohort of data objects similar to the query object. Generally, a cohort is a collection of data objects that are close to the query object with respect to a given data feature. In some examples, the interaction processor 114 may rank the data objects of the plurality of data objects 102 based on the Euclidean distance distributions for the given data feature, and select the top-k data objects as the sub-plurality of the plurality of data objects. In some examples, selector 110 may select the sub-plurality of the plurality of data objects based on a threshold score. For example, all data objects with Euclidean distance distributions above a threshold may be selected as the sub-plurality of the plurality of data objects.

In some examples, the interaction processor 114 may identify the cohort of data objects for the query object 104 based on the Euclidean distance distribution, the cohort indicative of nearest neighbors for the query object. In some examples, the interaction processor 114 may provide the Euclidean distance distribution and the cohort of data objects together. In some examples, the interaction processor 114 may iteratively interact with the computing device to provide an adjustable slider to adjust a threshold for the Euclidean distance distribution, and may identify the cohort of data objects based on the adjusted threshold. For example, a domain expert may interactively adjust the threshold to increase or decrease the number of data objects in the cohort. In some examples, increasing the Euclidean distance increases the number of data objects in the cohort, whereas decreasing the Euclidean distance decreases the number of data objects in the cohort. The nearest neighbors identified in the cohort may be ranked based on the component scores.

Although the description herein is based on the Euclidean distance distribution, similar visual representations and selections based on an adjustable slider may be provided for other representations of the similarity measure.

Figure 9A:
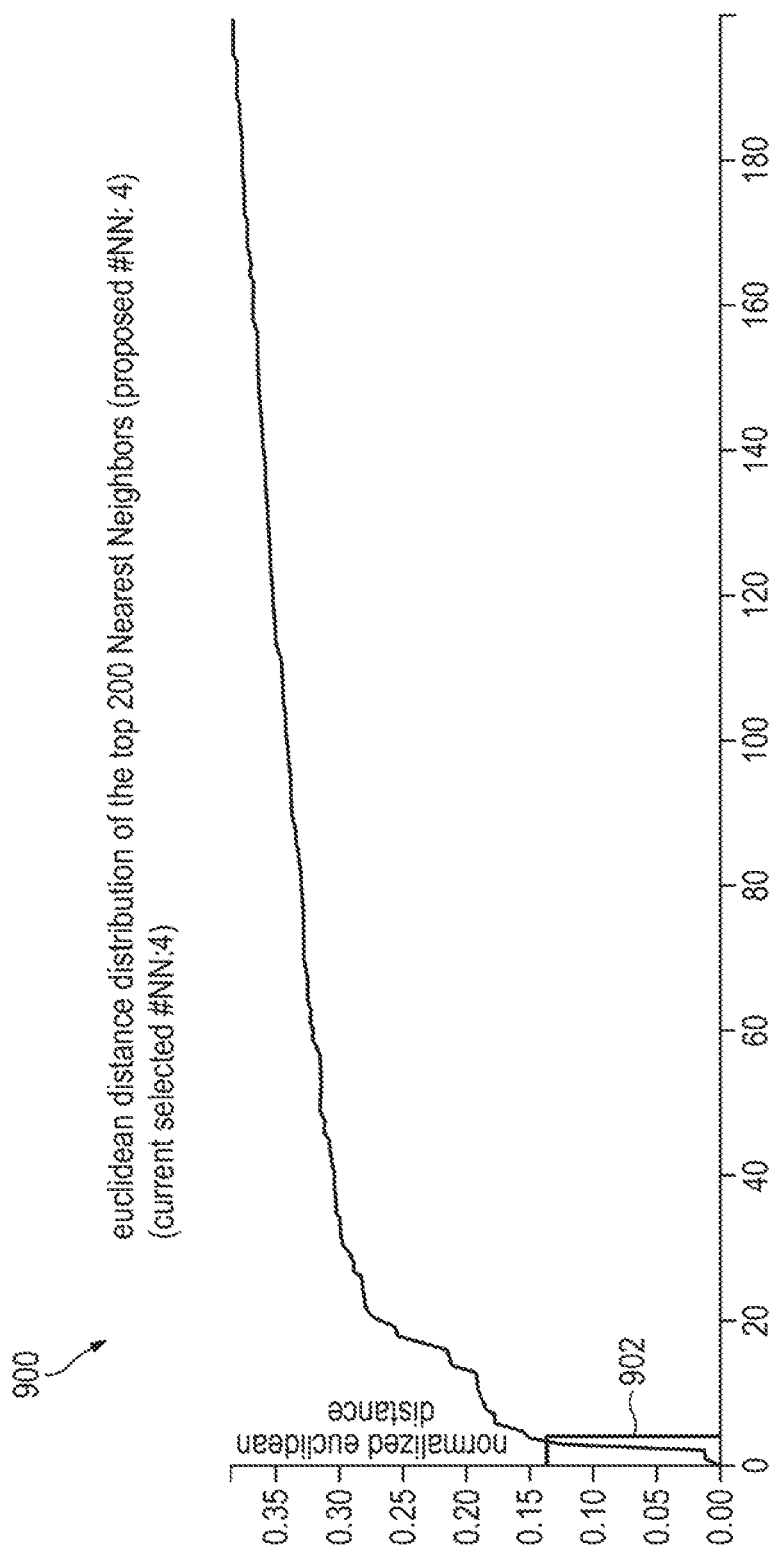
FIG. 9A illustrates an example of interactively determining a cohort of data objects similar to a query object.

FIG. 9A illustrates an example of interactively determining a cohort of data objects similar to a query object. A Euclidean distance distribution 900 is provided via a graphical user interface. In some examples, the Euclidean distance distribution 900 may include an adjustable slider 902 that may be slid along the graph representative of the Euclidean distance distribution 900. Sliding the slider 902 may increase or decrease the distance from the query object, thereby increasing or decreasing the number of nearest neighbors 904 (shown in FIG. 9B).

FIG. 9B illustrates an example of a cohort of data objects similar to a query object. Top nearest neighbors 904 are illustrated for a query object "Butter with Salt". The data objects in the list are ranked based on their respective distances from the query object. The top nearest neighbors 904 are interactively linked to the Euclidean distance distribution 900. As indicated in the first column of the nearest neighbor table, the Euclidean distance of the query object from itself is 0.0. The data object "Butter with Whipped Cream" is at a distance of 0.011006059019753668. Component scores for data features "Water", "Energy", "Protein", "Lipid", "Ash", "Carbohydrate", "Fiber", "Sugar" "Calcium", "Iron", "Magnesium", "Phosphorous", "Potassium", and so forth are displayed as well. "Butter without Salt" and "Butter Oil Anhydrous" are the remaining data objects in the cohort. As illustrated, slider 902 is set at a threshold of 5 units from 0. Accordingly, "Butter with Salt". "Butter with Whipped Cream", "Butter without Salt" and "Butter Oil Anhydrous" are the data objects included in the query. Adjusting the slider 902 to a lower threshold (i.e., decreasing the distance from the query object) may eliminate a data object from the cohort. Adjusting the slider 902 to a higher threshold (i.e., increasing the distance from the query object) may add a data object to the cohort.

Figure 10A:
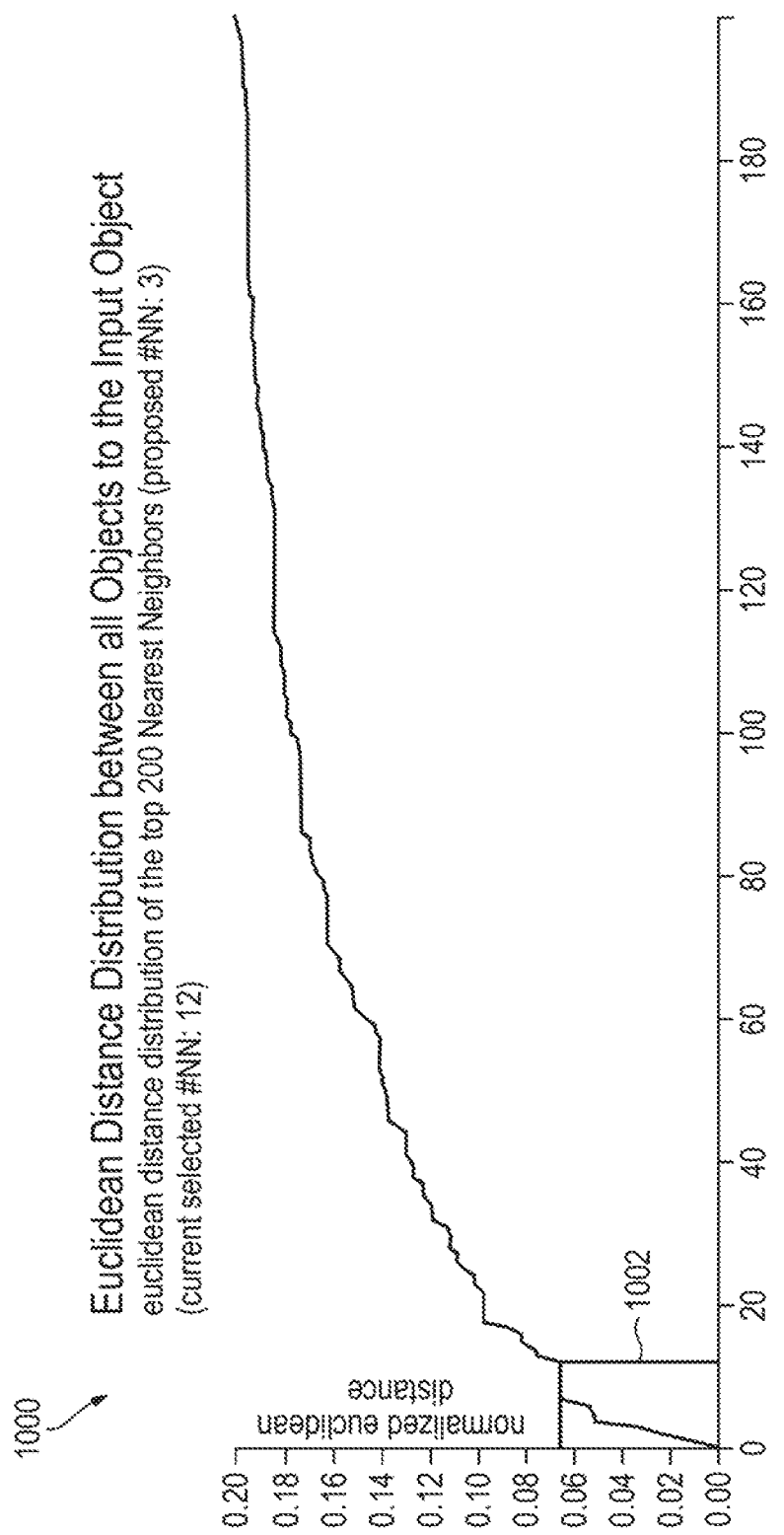
FIG. 10A illustrates another example of interactively determining a cohort of data objects similar to a query object.

FIG. 10A illustrates another example of interactively determining a cohort of data objects similar to a query object. A Euclidean distance distribution 1000 is provided via a graphical user interface. In some examples, the Euclidean distance distribution 1000 may include an adjustable slider 1002 that may be slid along the graph representative of the Euclidean distance distribution 1000. Sliding the slider 1002 may increase or decrease the distance from the query object, thereby increasing or decreasing the number of nearest neighbors 1004 (shown in FIG. 10B).

FIG. 10B illustrates another example of a cohort of data objects similar to a query object. Top nearest neighbors 1004 are illustrated for a query object "online wellsfargo.com". The data objects in the list are ranked based on their respective distances from the query object. The top nearest neighbors 1004 are interactively linked to the Euclidean distance distribution 1000 of FIG. 10A. As indicated in the first column of the nearest neighbor table, the Euclidean distance of the query object from itself is 0.0. The data object "im.rediff.com" is at a distance of 0.0108415642169049. Component scores for data features "sc_filter_results_DENIED", "sc_filter_results_OBSERVED", "sc_filter_results_PROXIED", "cs_categories_Adult_Mature_Content", "cs_categories_ArtCulture", and so forth are displayed as well. "dashboard1.transerainc.net", "s.c.lnkd.licdn.com", "a248.e.akamai.net", "www.ktvb.com" and so forth are additional data objects in the cohort. As illustrated, slider 1002 is set at a threshold of approximately 12 units from 0. Accordingly, "online wellsfargo.com", "im.rediff.com", "sc_filter_resultsDENIED", "sc_filter_results_OBSERVED", "sc_filter_results_PROXIED", "cs_categories_Adult_Mature_Content", "cs_categories_ArtCulture", and so forth are the data objects included in the query. Adjusting the slider 1002 to a lower threshold (i.e., decreasing the distance from the query object) may eliminate a data object from the cohort. Adjusting the slider 1002 to a higher threshold (i.e., increasing the distance from the query object) may add a data object to the cohort.

The components of system 100 may be computing resources, each including a suitable combination of a physical computing device, a virtual computing device, a network, software, a cloud infrastructure, a hybrid cloud infrastructure that includes a first cloud infrastructure and a second cloud infrastructure that is different from the first cloud infrastructure, and so forth. The components of system 100 may be a combination of hardware and programming for performing a designated function. In some instances, each component may include a processor and a memory, while programming code is stored on that memory and executable by a processor to perform a designated function.

For example, data processor 106 may comprise a plurality of databases communicatively linked over a network. Data processor 106 may include hardware to physically store datasets, and processors to physically process the data. Data processor 106 may also include software algorithms to process the datasets and share them over a network. Data processor 106 may also include software algorithms to determine feature distributions of numerical components. As another example, selector 110 may include software programming that receives the feature distributions from the data processor 106. Selector 110 may also include software programming to automatically select the sub-plurality of data features based on the feature distributions. Selector 110 may also include software programming to dynamically interact with the interaction processor 114 to receive feedback related to domain knowledge, and refine its selection of the sub-plurality of data features. Selector 110 may include hardware, including physical processors and memory to house and process such software algorithms. Selector 110 may also include physical networks to be communicatively linked to the data processor 106, evaluator 108, and the interaction processor 114.

Also, for example, evaluator 108 may include software programming that receives the selected sub-plurality of data features from the selector 110. Evaluator 108 may also include software programming to determine the similarity measure. Evaluator 108 may also include software programming to dynamically interact with the selector 110 to receive feedback related to selection of the sub-plurality of data features, and modify the similarity measures accordingly. Evaluator 108 may also include hardware, including physical processors and memory to house and process such software algorithms, and physical networks to be communicatively linked to the data processor 106 and the selector 110.

Likewise, the interaction processor 114 may include software programming that receives the selected sub-plurality of data features from the selector 110. The interaction processor 114 may include hardware, including physical processors and memory to display an interactive visual representation of the similarity measures and/or feature distributions. For example, the interaction processor 114 may include a graphical user interface. Also, for example, the interaction processor 114 may include a computing device to provide the graphical user interface. The interaction processor 114 may include software programming to interact with a domain expert and receive feedback related to domain knowledge. The interaction processor 114 may also include hardware, including physical processors and memory to house and process such software algorithms, and physical networks to be communicatively linked to the selector 110 and to computing devices.

The computing device may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a visually interactive identification of a cohort of data objects similar to a query object based on domain knowledge. Computing device may include a processor and a computer-readable storage medium.

Figure 11:
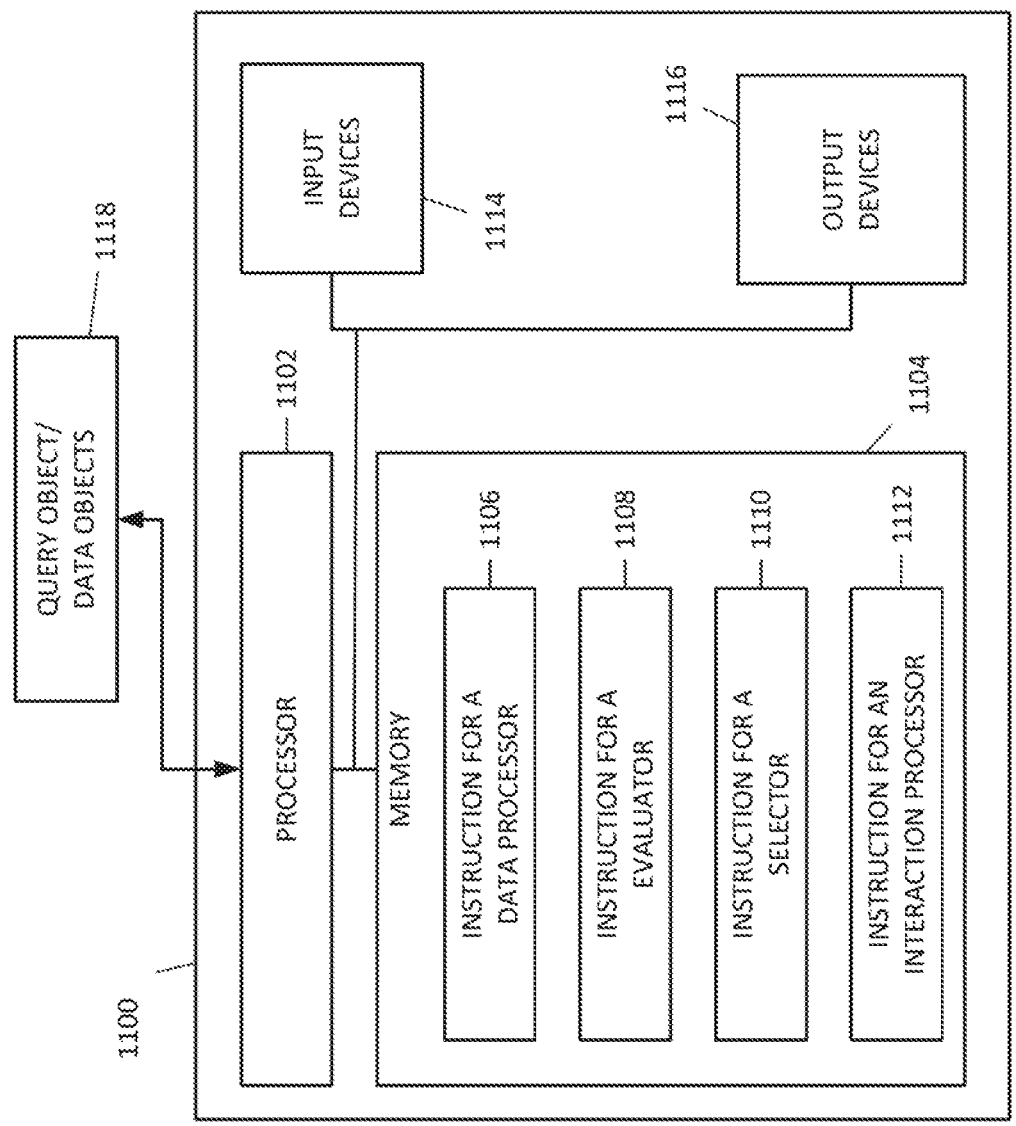
FIG. 11 is a block diagram illustrating one example of a processing system for implementing the system for visually interactive identification of a cohort of data objects similar to a query object based on domain knowledge.

FIG. 11 is a block diagram illustrating one example of a processing system 1100 for implementing the system 100 for visually interactive identification of a cohort of data objects similar to a query object based on domain knowledge. Processing system 1100 includes a processor 1102, a memory 1104, input devices 1114, and output devices 1116. A query object and/or data objects 1118 may be accessed from an external database that may be interactively linked to the processing system 1100 via the processor 1102. In some examples, the query object and/or data objects 1118 may be stored in the memory 1104. Processor 1102, memory 1104, input devices 1114, and output devices 1116 are coupled to each other through communication link (e.g., a bus).

Processor 1102 includes a Central Processing Unit (CPU) or another suitable processor. In some examples, memory 1104 stores machine readable instructions executed by processor 1102 for operating processing system 1100. Memory 1104 includes any suitable combination of volatile and/or non-volatile memory, such as combinations of Random Access Memory (RAM), Read-Only Memory (ROM), flash memory, and/or other suitable memory.

Query object and/or data objects 1118 may each comprise a plurality of numerical components, where each component represents a data feature of a plurality of data features. The query object may be any user provided query object querying a high-dimensional dataset including the query object and/or data objects 1118.

Memory 1104 also stores instructions to be executed by processor 1102 including instructions of a data processor 1106, of an evaluator 1108, of a selector 1110, and of an interaction processor 1112. In some examples, instructions of data processor 1106, evaluator 1108, selector 1110, and interaction processor 1112, include instructions of data processor 106, evaluator 108, selector 110, and interaction processor 114, respectively, as previously described and illustrated with reference to FIG. 1.

Processor 1102 executes instructions of data processor 1106 to access a plurality of data objects 1118, each data object comprising a plurality of numerical components, where each component represents a data feature of a plurality of data features. In some examples, processor 1102 also executes instructions of data processor 1106 to access the query object 1118. Processor 1102 executes instructions of data processor 1106 to identify, for each data feature, a feature distribution of the numerical components.

Processor 1102 executes instructions of selector 1110 to select a sub-plurality of the data features of the query object, where a given data feature is selected if the component representing the given data feature is a peak for the feature distribution of the given data feature. The sub-plurality of data features are representative of dimensions that are relevant to the query object. Accordingly, the query object, representative of a higher-dimensional vector, is reduced to a lower dimensional vector based on the selected sub-plurality of data features.

Processor 1102 executes instructions of evaluator 1108 to determine, for a query object and a data object, a similarity measure based on the sub-plurality of the data features, the similarity measure indicative of data features common to the query object and the data object. In some examples, processor 1102 executes instructions of evaluator 1108 to detect a peak in a distance histogram by identifying a bin with a small width. As described herein, narrow bins may represent a peak while wider bins may represent a sparse area. In some examples, processor 1102 executes instructions of evaluator 1108 to determine a component score for each data feature of the sub-plurality of the data features, the component score based on a position of a detected peak in the distance histogram. In some examples, processor 1102 executes instructions of evaluator 1108 to rank the data features of the sub-plurality of data features based on the component scores.

In some examples, processor 1102 executes instructions of evaluator 1108 to determine, for a given data feature, a Euclidean distance distribution between the query object and the plurality of data objects, the Euclidean distance distribution indicative of data objects similar to the query object for the given data feature. In some examples, processor 1102 executes instructions of evaluator 1108 to determine, based on the Euclidean distance distribution, a distance distribution attribute for the given data feature of the query object.

Processor 1102 executes instructions of an interaction processor 1112 to provide, to a computing device via a graphical user interface, an interactive distance histogram representing the feature distributions. Processor 1102 executes instructions of an interaction processor 1112 to process, based on the interactive distance histogram, selection of a sub-plurality of the data features, the selection based on domain knowledge, and. In some examples, the interactive distance histogram is a distance histogram with equal depth.

In some examples, processor 1102 executes instructions of an interaction processor 1112 to provide, via the graphical user interface, an adjustable slider to adjust a threshold for the Euclidean distance distribution. In some examples, processor 1102 executes instructions of interaction processor 1112 to identify the cohort of data objects based on the adjusted threshold. In some examples, processor 1102 executes instructions of an interaction processor 1112 to provide for display, via the graphical user interface, a graphical representation of the distance distribution attribute, where the horizontal axis represents a normalized distance distribution attribute, and the vertical axis represents a number of the data objects similar to the query object.

In some examples, the iterative selection includes at least one of adding a first data feature to the sub-plurality of data features and deleting a second data feature from the sub-plurality of data features. In general, the iterative process may be repeated by the interaction processor 1112 as long as the interaction processor 1112 does not receive an indication (e.g., from a domain expert via the computing device) of being satisfied with the sub-plurality of data features. In some examples, the process may terminate when no data features (or interesting dimensions) are identified and/or selected.

In some examples, processor 1102 executes instructions of an interaction processor 1112 to identify, based on the similarity measures, a cohort of data objects similar to the query object. In some examples, processor 1102 executes instructions of an interaction processor 1112 to identify a cohort of data objects for the query object based on the Euclidean distance distribution, the cohort indicative of nearest neighbors for the query object.

Input devices 1114 include a keyboard, mouse, data ports, and/or other suitable devices for inputting information into processing system 1100. In some examples, input devices 1114, such as a computing device, are used by the interaction processor 1108 to process, based on the interactive distance histogram, selection of a sub-plurality of the data features, the selection based on domain knowledge. Output devices 1116 include a monitor, speakers, data ports, and/or other suitable devices for outputting information from processing system 1100. In some examples, output devices 1116 are used to provide, to a computing device, an interactive distance histogram representing the feature distributions.

Figure 12:
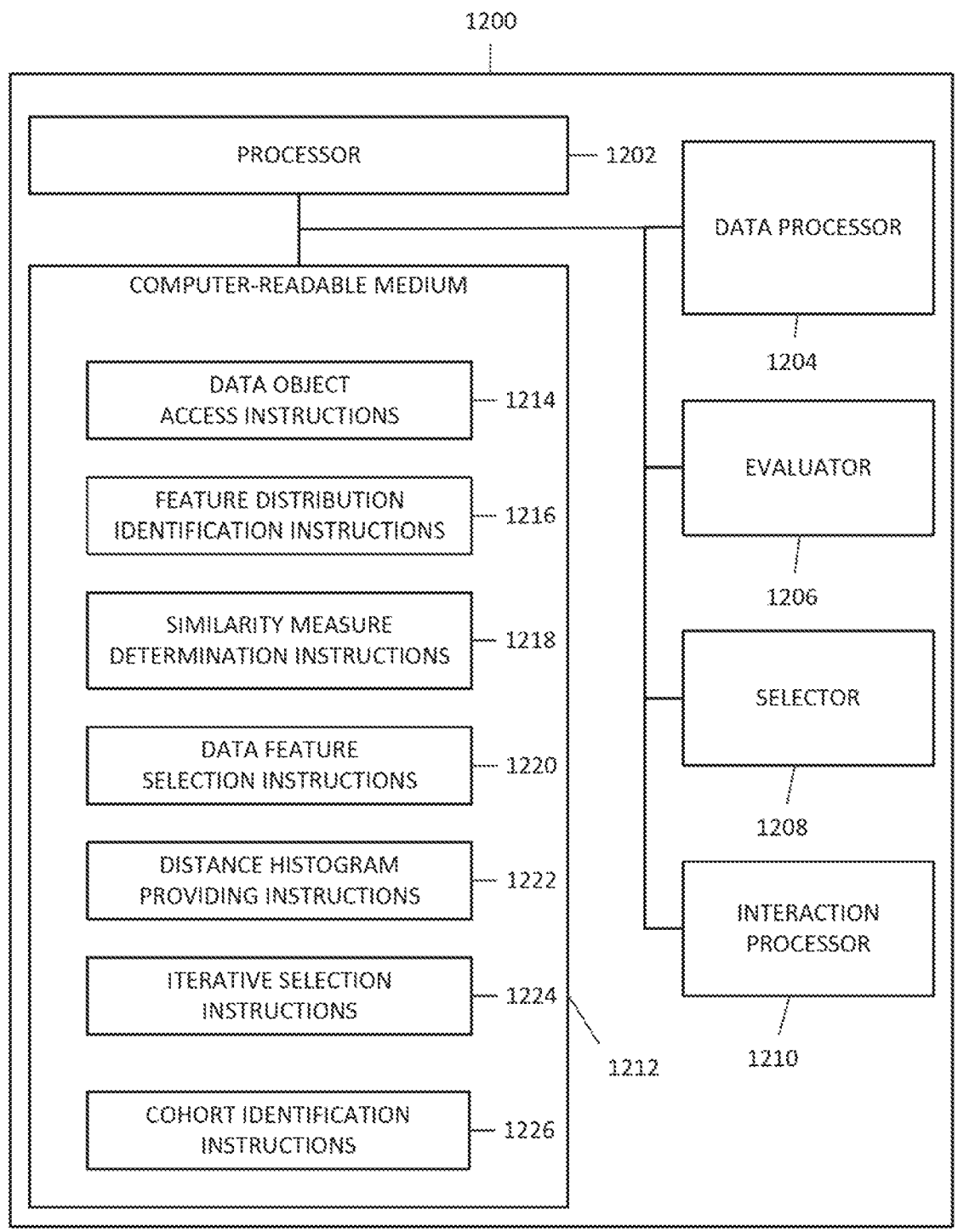
FIG. 12 is a block diagram illustrating one example of a computer readable medium for visually interactive identification of a cohort of data objects similar to a query object based on domain knowledge.

FIG. 12 is a block diagram illustrating one example of a computer readable medium for visually interactive identification of a cohort of data objects similar to a query object based on domain knowledge. Processing system 1200 includes a processor 1202, a computer readable medium 1212, an evaluator 1206, a selector 1208, and an interaction processor 1210. Processor 1202, computer readable medium 1212, evaluator 1206, selector 1208, and interaction processor 1210 are coupled to each other through communication link (e.g., a bus).

Processor 1202 executes instructions included in the computer readable medium 1212. Computer readable medium 1212 includes data object access instructions 1214 of a data processor 1204 to access, via processor 1202, a plurality of data objects, each data object comprising a plurality of numerical components, where each component represents a data feature of a plurality of data features. Computer readable medium 1212 includes feature distribution identification instructions 1216 of a data processor 1204 to identify, for each data feature, a feature distribution of the components associated with the data feature.

Computer readable medium 1212 includes similarity measure determination instructions 1218 of an evaluator 1206 to determine, for a query object and a data object, a similarity measure based on a sub-plurality of the data features, the similarity measure indicative of data features common to the query object and the data object. Computer readable medium 1212 includes data feature selection instructions 1220 of a selector 1208 to select a sub-plurality of the data features of the query object, wherein a given data feature is selected if the component representing the given data feature is a peak for the feature distribution of the given data feature.

Computer readable medium 1212 includes distance histogram providing instructions 1222 of an interaction processor 1210 to provide, to a computing device, an interactive distance histogram representing the feature distributions. Computer readable medium 1212 includes iterative selection instructions 1224 of an interaction processor 1210 to iteratively process, based on the interactive distance histogram, selection of a sub-plurality of the data features, the selection based on domain knowledge.

In some examples, computer readable medium 1212 includes iterative selection instructions 1224 of an interaction processor 1210 to identify a cohort of data objects similar to the query object. In some examples, computer readable medium 1212 includes iterative selection instructions 1224 of an interaction processor 1210 to identify a cohort of data objects based on a Euclidean distance distribution for the sub-plurality of data features.

Computer readable medium 1212 includes cohort identification instructions 1226 of an interaction processor 1210 to identify, based on the similarity measures, a cohort of data objects similar to the query object.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 1212 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 400 are identified and refer to a combination of hardware and programming configured to perform a designated function. As illustrated in FIG. 12, the programming may be processor executable instructions stored on tangible computer readable medium 1212, and the hardware may include processor 1202 for executing those instructions. Thus, computer readable medium 1212 may store program instructions that, when executed by processor 1202, implement the various components of the processing system 1200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 1212 may be any of a number of memory components capable of storing instructions that can be executed by processor 1202. Computer readable medium 1212 may be non-transitory in the sense that it does not encompass a transitory signal but instead is made up of one or more memory components configured to store the relevant instructions. Computer readable medium 1212 may be implemented in a single device or distributed across devices. Likewise, processor 1202 represents any number of processors capable of executing instructions stored by computer readable medium 1212. Processor 1202 may be integrated in a single device or distributed across devices. Further, computer readable medium 1212 may be fully or partially integrated in the same device as processor 1202 (as illustrated), or it may be separate but accessible to that device and processor 1202. In some examples, computer readable medium 1212 may be a machine-readable storage medium.

Figure 13:
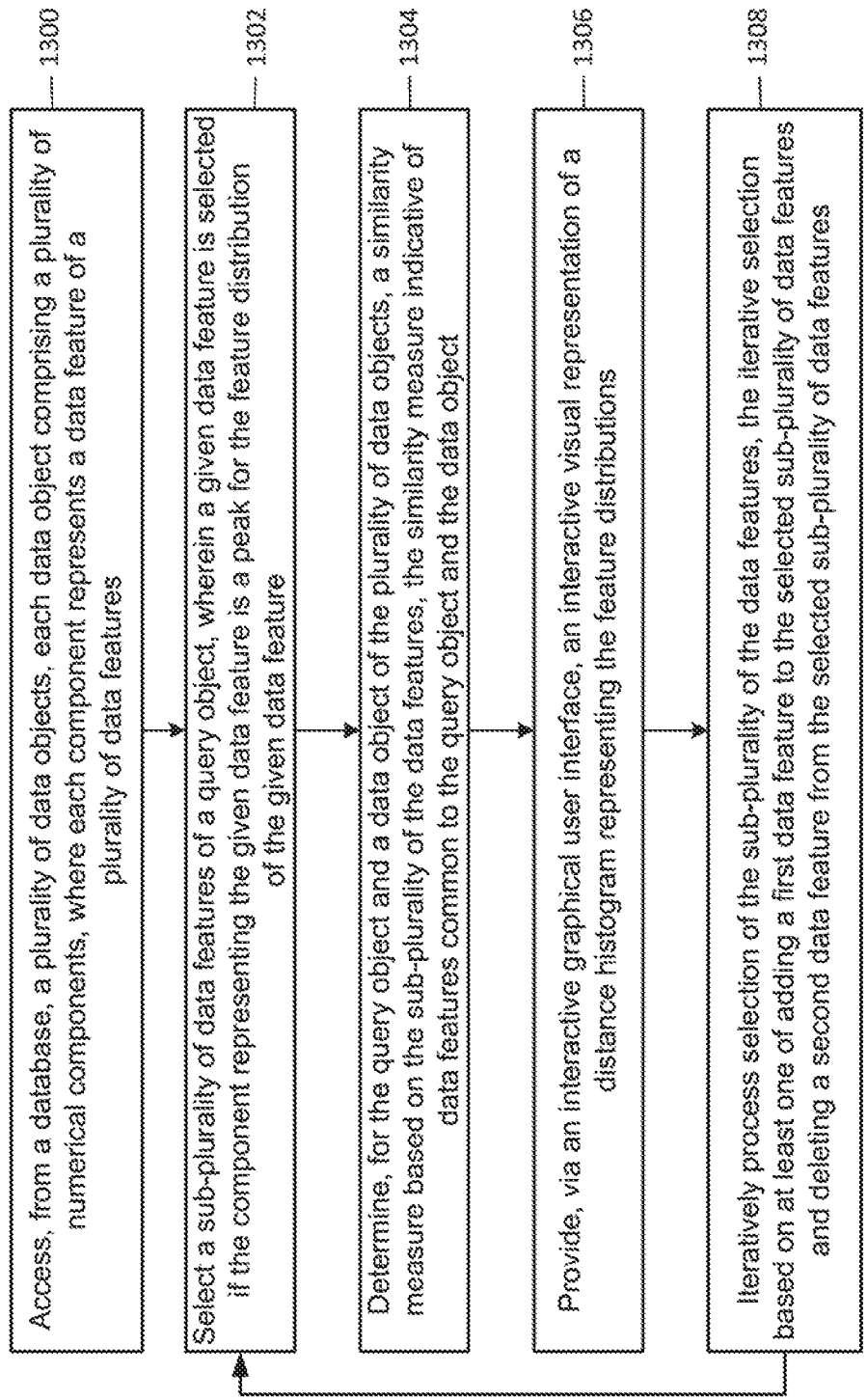
FIG. 13 is a flow diagram illustrating one example of a method for visually interactive identification of a cohort of data objects similar to a query object based on domain knowledge.

FIG. 13 is a flow diagram illustrating one example of a method for visually interactive identification of a cohort of data objects similar to a query object based on domain knowledge. At 1300, a plurality of data objects are accessed from a database, each data object comprising a plurality of numerical components, where each component represents a data feature of a plurality of data features. At 1302, a sub-plurality of data features of a query object is selected, where a given data feature is selected if the component representing the given data feature is a peak for the feature distribution of the given data feature. At 1304, a similarity measure is determined for the query object and a data object of the plurality of data objects, the determination based on the sub-plurality of the data features, and the similarity measure being indicative of data features common to the query object and the data object. At 1306, an interactive visual representation of a distance histogram representing the feature distributions is provided via an interactive graphical user interface. At 1308, selection of the sub-plurality of the data features is iteratively processed, the iterative selection based on at least one of adding a first data feature to the selected sub-plurality of data features and deleting a second data feature from the selected sub-plurality of data features. In some examples, the method returns to 1302, and the similarity measures and distance histograms are determined iteratively.

In some examples, the method includes identifying, based on the similarity measures, a cohort of data objects similar to the query object.

In some examples, the similarity measure may be a dimension interestingness measure for higher dimensional data objects.

In some examples, the similarity measure may be a Euclidean distance distribution between the query object and the plurality of data objects, the Euclidean distance distribution indicative of data objects similar to the query object for the given data feature. In some examples, the method includes providing, via the interactive graphical user interface, a visual representation of the Euclidean distance distribution. In some examples, the method includes providing, via the graphical user interface, an adjustable slider to adjust a threshold for the Euclidean distance distribution, and further identifies the cohort of data objects based on the adjusted threshold. In some examples, the method includes determining, based on the Euclidean distance distribution, a distance distribution attribute for the given data feature of the query object.

Examples of the disclosure provide a generalized system for visually interactive identification of a cohort of data objects similar to a query object based on domain knowledge. The generalized system provides a visually-guided interactive approach for searching similar data objects (nearest neighbors, cohort) in a high dimensional space, and enables dynamic integration of domain knowledge (i.e., through an iterative interaction with a domain expert) into the search and ranking process, thus limiting the search space and computation to only those that are interesting to domain experts. The generalized system allows an end user to interactively explore interesting dimension from a high-dimensional dataset. The dimension interestingness measure enables automatic selection of a dimension to a query object in a high dimensional space. The distance histogram may be utilized to observe feature distributions of a query object. The normalized Euclidean distance distribution between all data objects to a query object may be utilized to determine nearest neighbors. The top nearest neighbor list may be interactively linked to the Euclidean distance distribution to display top nearest neighbors. A domain expert may increase or decrease the number of nearest neighbors by adjusting the distance.

Although specific examples have been illustrated and described herein, especially as related to healthcare data, the examples illustrate applications to any structured data. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A computer system comprising:
a memory storing a database; and
a computer processor communicatively coupled to the memory and configured to:
    access a plurality of data objects in the database, each data object comprising a plurality of numerical components, wherein each component represents a data feature of a plurality of data features;
    identify, for each data feature, a feature distribution of the numerical components associated with the data feature;
    select a sub-plurality of data features of a query object, wherein a given data feature is selected if the component representing the given data feature is a peak for the feature distribution of the given data feature;

determine, for the query object and a data object, a similarity measure based on the sub-plurality of the data features, the similarity measure indicative of data features common to the query object and the data object;

provide, via an interactive graphical user interface, an interactive visual representation of a distance histogram representing the feature distributions of the plurality of data features;

iteratively process, based on the interactive distance histogram, selection of a sub-plurality of the data features, the selection based on domain knowledge; and identify, based on the similarity measures, a cohort of data objects similar to the query object.

2. The computer system of claim 1, wherein the interactive distance histogram is a distance histogram with equal depth.

3. The computer system of claim 2, wherein the computer processor is further configured to detect a peak in the distance histogram by identifying a bin with a small width.

4. The computer system of claim 3, wherein the computer processor is further configured to determine a component score for each data feature of the sub-plurality of the data features, the component score based on a position of a detected peak in the distance histogram.

5. The computer system of claim 4, wherein the computer processor is further configured to rank the data features of the sub-plurality of data features based on the component scores.

6. The computer system of claim 1, wherein the similarity measure is a dimension interestingness measure for higher dimensional data objects.

7. The computer system of claim 1, wherein the similarity measure is a Euclidean distance distribution between the query object and the plurality of data objects, the Euclidean distance distribution indicative of data objects similar to the query object for the given data feature.

8. The computer system of claim 7, wherein the computer processor is further configured to provide, via the interactive graphical user interface, a visual representation of the Euclidean distance distribution.

9. The computer system of claim 8, wherein the computer processor is further configured to provide, via the graphical user interface, an adjustable slider to adjust a threshold for the Euclidean distance distribution, and further identify the cohort of data objects based on the adjusted threshold.

10. The computer system of claim 7, wherein the computer processor is further configured to determine, based on the Euclidean distance distribution, a distance distribution attribute for the given data feature of the query object.

11. The computer system of claim 10, wherein the computer processor is further configured to provide for display a graphical representation of the distance distribution attribute, wherein the horizontal axis represents a normalized distance distribution attribute, and the vertical axis represents a number of the data objects similar to the query object.

12. The computer system of claim 1, wherein the iterative selection includes at least one of adding a first data feature to the sub-plurality of data features and deleting a second data feature from the sub-plurality of data features.

13. A method to determine a similarity measure, the method comprising:

accessing, from a database, a plurality of data objects, each data object comprising a plurality of numerical components, wherein each component represents a data feature of a plurality of data features;

identifying, for each data feature, a feature distribution of the numerical components associated with the data feature;

selecting a sub-plurality of data features of a query object, wherein a given data feature is selected if the component representing the given data feature is a peak for a feature distribution of the given data feature;

determining, for the query object and a data object of the plurality of data objects, a similarity measure based on the sub-plurality of the data features, the similarity measure indicative of data features common to the query object and the data object;

providing, via an interactive graphical user interface, an interactive visual representation of a distance histogram representing the feature distributions of the plurality of data features; and iteratively processing selection of the sub-plurality of the data features, the iterative selection based on at least one of adding a first data feature to the selected sub-plurality of data features and deleting a second data feature from the selected sub-plurality of data features.

14. The method of claim 13, further comprising identifying, based on the similarity measures, a cohort of data objects similar to the query object wherein the cohort of data objects are selected from the plurality of data objects.

15. A non-transitory computer readable medium comprising executable instructions to:

access, via a processor, a plurality of data objects, each data object comprising a plurality of numerical components, wherein each component represents a data feature of a plurality of data features;

identify, for each data feature, a feature distribution of the components associated with the data feature;

select a sub-plurality of data features of a query object, wherein a given data feature is selected if the component representing the given data feature is a peak for the feature distribution of the given data feature;

determine, for the query object and a data object of the plurality of data objects, a similarity measure based on the sub-plurality of the data features, the similarity measure indicative of data features common to the query object and the data object;

provide, to a computing device, an interactive visual representation of a distance histogram representing the feature distributions of the plurality of data features;

iteratively process, based on the interactive distance histogram, selection of a sub-plurality of the data features, the selection based on domain knowledge; and identify, based on the similarity measures, a cohort of data objects similar to the query object.

* * * * *

UNITED STATES PATENT AND TRADEMARK OFFICE
CERTIFICATE OF CORRECTION

PATENT NO. : 10,509,800 B2
APPLICATION NO. : 15/519734
DATED : December 17, 2019
INVENTOR(S) : Ming C Hao et al.

It is certified that error appears in the above-identified patent and that said Letters Patent is hereby corrected as shown below:

In the Drawings

In sheet 1 of 17, FIG. 1, reference numeral 108, Line 3, delete "SIMIALRITY" and insert -- SIMILARITY --, therefor.

In sheet 1 of 17, FIG. 1, reference numeral 114, Line 3, delete "RPOVIDE" and insert -- PROVIDE --, therefor.

In sheet 12 of 17, FIG. 9B, reference numeral 904, Line 3, delete "eulidean_distance" and insert -- euclidean_distance --, therefor.

In sheet 12 of 17, FIG. 9B, Line 8, delete "Suger_Tot" and insert -- Sugar_Tot --, therefor.

In sheet 14 of 17, FIG. 10B, reference numeral 1004, Line 3, delete "eulidean_distance" and insert -- euclidean_distance --, therefor.

Signed and Sealed this
Tenth Day of March, 2020

Andrei Iancu
*Director of the United States Patent and Trademark Office*